(12) United States Patent
Enomoto et al.

(10) Patent No.: US 6,719,224 B2
(45) Date of Patent: Apr. 13, 2004

(54) FUEL INJECTOR AND FUEL INJECTION SYSTEM

(75) Inventors: Shigeiku Enomoto, Hol-gun (JP); Moriyasu Goto, Toyohashi (JP); Tetsuo Morita, Kariya (JP); Masaaki Kato, Kariya (JP); Hisaharu Takeuchi, Tokoname (JP)

(73) Assignees: Nippon Soken, Inc., Aichi-Pref. (JP); Denso Corporation, Aichi-Pref. (JP)

( * ) Notice: Subject to any disclaimer, the term of this patent is extended or adjusted under 35 U.S.C. 154(b) by 0 days.

(21) Appl. No.: 10/321,429

(22) Filed: Dec. 18, 2002

(65) Prior Publication Data

US 2003/0110780 A1 Jun. 19, 2003

(30) Foreign Application Priority Data

Dec. 18, 2001 (JP) ........................................ 2001-384772
Jan. 23, 2002 (JP) ........................................ 2002-014338

(51) Int. Cl.[7] ........................... B05B 1/30; F02M 51/00; F02M 61/20; F16K 31/12
(52) U.S. Cl. ............................. 239/585.1; 239/585.4; 239/533.9; 251/50
(58) Field of Search ..................... 239/585.1, 585.4, 239/533.9, 533.2, 533.3, 585.3, 585.5, 88, 89, 91; 251/50, 48

(56) References Cited

U.S. PATENT DOCUMENTS

| | | | | |
|---|---|---|---|---|
| 4,646,976 A | * | 3/1987 | Rembold et al. | 239/585.3 |
| 4,957,275 A | * | 9/1990 | Homes | 251/129.02 |
| 5,044,563 A | * | 9/1991 | Mesenich | 239/585.4 |
| 5,118,076 A | * | 6/1992 | Homes | 251/129.02 |
| 5,375,576 A | * | 12/1994 | Ausman et al. | 123/446 |
| 5,651,501 A | * | 7/1997 | Maley et al. | 239/88 |
| 5,803,369 A | | 9/1998 | Toyao et al. | |
| 5,967,126 A | | 10/1999 | Ofner | |
| 6,168,091 B1 | * | 1/2001 | Rodier et al. | 239/88 |
| 6,517,047 B2 | * | 2/2003 | Koch-Groeber | 251/129.16 |

FOREIGN PATENT DOCUMENTS

JP          10-18934          1/1998

\* cited by examiner

Primary Examiner—Michael Mar
Assistant Examiner—Darren Gorman
(74) Attorney, Agent, or Firm—Nixon & Vanderhye PC

(57) ABSTRACT

A fuel supply system has a pump, a common rail, and injectors. Pressurized fuel is stored in the common rail. The common rail distributes the fuel to the injectors. A liquid fuel and a liquefied gas fuel such as dimethyl ether and a liquefied petroleum gas may be used as a fuel. In each injector, a valve element is actuated directly by an electromagnetic actuator. The injector has a low pressure chamber for decreasing a biasing force which acts on the valve element in a valve closing direction. The valve element can be divided for replacement. The injector has means for suppressing the bounce of the valve element. A hydraulic unit which utilizes the fuel suppresses the bounce of the valve element. The fuel supply system is connected to a refrigerating cycle. The fuel leaking from the fuel supply system is cooled and again liquefied by the refrigerating cycle.

10 Claims, 27 Drawing Sheets

<u>RELATED ART</u>

# FUEL INJECTOR AND FUEL INJECTION SYSTEM

CROSS REFERENCE TO RELATED APPLICATION

This application is based on Japanese Patent Applications No. 2001-307355 filed on Oct. 3, 2001, No. 2001-308495 filed on Oct. 4, 2001, No. 2001-317688 filed on Oct. 16, 2001, No. 2001-384772 filed on Dec. 18, 2001 and No. 2002-14338 filed on Jan. 23, 2002 the contents of which are incorporated herein by reference.

BACKGROUND OF THE INVENTION

1. Field of the Invention

The present invention relates to a fuel injection system and a fuel injector in an internal combustion engine (hereinafter referred to simply as engine).

2. Related Art

For example, in the case of a common rail type fuel injection system applied to a diesel engine, there usually is employed a fuel injector having a two- or three-way solenoid valve. In connection with such a fuel injector, for example the technique disclosed in JP-A-9-42106 is well known. According to this technique, fuel of a high pressure is introduced into a pressure control chamber provided on an opposite-to-nozzle holes side of a valve element, and the valve element is actuated by allowing the high-pressure fuel present in the pressure control chamber to leak to a low pressure side at every fuel injection. However, in the case of the fuel injector disclosed in the above publication, there occurs leakage of the high-pressure fuel from the pressure control chamber at every fuel injection. There also is a problem that the number of components increases and the structure becomes complicated.

Recently there has been an increasing demand for reducing the cost of the fuel injector. To meet this demand, that is, for reducing the number of components which constitute the fuel injector, a study is being made about a direct-acting type fuel injector in which a valve element is actuated directly by an electromagnetic drive unit.

On the other hand, as an alternative to gas oil and taking the volatilizability, ignitability and combustibility of fuel or emission into account, there recently has been studied the use of liquefied gas fuels such as dimethyl ether (DME) and liquefied petroleum gas (LPG) with a cetane number improving additive incorporated therein. LPG as referred to herein means a liquefied petroleum gas with a cetane number improver incorporated therein unless otherwise specified. In case of using a liquefied gas fuel, the fuel is apt to vaporize because of a low boiling point and the amount of fuel leaking from the fuel injector tends to increase. Therefore, it becomes necessary to provide a recovery system for recovering fuel leaking from the fuel injector. For example, as is disclosed in JP-A-11-22590, it is necessary to provide a purge tank for the recovery of vaporized liquefied gas fuel and a compression pump for compressing and liquefying a gaseous liquefied gas fuel recovered into the purge tank. As a result, there arises the problem that the cost of the fuel injection system concerned increases. To solve this problem, as noted above, it is proposed to use, for example, such a direct acting type fuel injector 100 as shown in FIG. 10 and thereby decrease the amount of fuel leaking from the fuel injector 100.

In the fuel injector 100 shown in FIG. 10, a valve element 101 extends vertically in the figure and an armature 102 is integrally provided at an upper end of the valve element 101 by laser welding for example. Holes 103a and 104a are formed in a casing 103 and a valve body 104, respectively, and the valve element 101 is received into the holes 103a and 104a. A stator 105 is disposed in opposition to the armature 102. When a coil 106 is energized and the armature 102 is thereby attracted to the stator 105, the valve element 101 lifts upward in FIG. 10 against the biasing force of a spring 107, whereby nozzle holes 108 are opened and high-pressure fuel fed from a common rail system is injected from the nozzle holes 108. In such a fuel injector 100 as shown in FIG. 10, the number of components is small and hence it is possible to attain the reduction of cost. Moreover, in the fuel injector 100 shown in FIG. 10, it is possible to decrease the amount of leaking fuel and therefore it becomes unnecessary to use a purge tank for the recovery of leaking fuel and a compression pump.

However, in the fuel injector 100 shown in FIG. 10, since the valve element 101 is actuated directly by an electromagnetic drive unit, it is necessary for the electromagnetic drive unit to actuate the valve member 101 against a force developed by an oil pressure acting on the valve element 101. Accordingly, for enhancing the injection pressure of fuel injected from the fuel injector 100, it is necessary to increase the size of the electromagnetic drive unit and thereby increase the driving force. However, the space ensured in an engine mounting portion is limited and therefore the size of the electromagnetic drive unit and that of the fuel injector 100 are limited. As a result, a maximum fuel injection pressure of about 30 MPa is a limit at present and a further increase of pressure is difficult.

For example, in connection with a common rail type fuel injection system for a diesel engine, there is known such a fuel injector as is disclosed in JP-A-10-18934. On the other hand, as a direct-acting type fuel injector there is proposed one illustrated in FIG. 16. In the same figure, components equal to those illustrated in FIG. 10 are identified by like reference numerals.

In an engine mounted on a vehicle, fuel injectors are replaced at every about 100,000 km running. In this case, for attaining the reduction of cost, it is proposed to remove a retaining nut 110 of a fuel injector 100 and replace only a nozzle portion 104 located at the tip of the injector. However, an armature 102 is fixed to a valve element 101 and the diameter of the armature 102 is usually larger than that of a hole 103a. This is for obtaining a satisfactory electromagnetic performance. Therefore, at the time of replacement of the nozzle portion 104, not only the removal of the retaining nut 110, but also a disassembling work for an electromagnetic solenoid portion 111 is required, resulting in that the maintainability is deteriorated. Thus, an improvement is desired.

FIG. 28 shows a fuel injector 100 in the related art. When a valve element 101 is opened, the valve member moves until abutment against a valve opening stopper 112. At this time, the valve element 101 bounces as a reaction of its abutment against the stopper 112. In many cases, for example the layout of intake/exhaust valves in an engine head portion requires the valve element 101 to be long, with the result that the valve member becomes heavy. Particularly, in the case of such a liquefied gas fuel as DME, the bounce of the valve element 101 becomes large. Such a bounce of the valve element 101 obstructs an accurate adjustment of fuel quantity.

In a fuel injector 100 shown in FIG. 33, when a valve element 101 opens, it strikes against a stopper 111 and bounces. Due to this bouncing during valve opening, an injection quantity Q becomes wavy relative to a pulse width T, thus making injection control difficult.

Further, when a coil 106 is de-energized, with loss in attraction of an armature 102 by a stator 105, and the valve element 101 closes with the biasing force of a spring 107, the valve element 101 strikes against a sheet portion of a nozzle body 104 and causes bouncing. Due to this bouncing in valve closing, there occurs re-injection (secondary injection) after the end of injection, thus resulting in deterioration of the injection characteristic.

On the other hand, in many cases, the valve element 101 is required to be long for example due to the layout of intake/exhaust valves in an engine head, resulting in that the valve element 101 becomes heavy and there occurs markedly such bouncing as referred to above.

Particularly in the case of such liquefied gas fuels as LPG and DME, since their viscosities are low, not only the bouncing of the valve element 101 becomes large, but also the time taken until damping of the bounding becomes long and the aforesaid inconvenience occurs markedly.

A leak fuel recovery system is disclosed, for example, in JP-A-11-22590. An outline thereof will now be given with reference to FIG. 35. In the same figure, fuel stored in a fuel tank 550 is discharged from a low pressure pump 551 and is compressed to a high pressure by means of a high pressure pump 552, then is fed to a common rail 553. Connected to the common rail 553 are fuel injectors 554 in a number corresponding to the number of engine cylinders.

Fuel leaking from the high pressure pump 552 and fuel injectors 554 is once recovered into a fuel recovery tank (purge tank) 555, then is liquefied by a fuel compressor 556 and is returned to the fuel tank 550.

In the construction of FIG. 35 it is necessary to provide a leak fuel recovery system comprising the fuel recovery tank 555 and the fuel compressor 556, thus giving rise to the problem that the construction becomes complicated and the cost increases.

SUMMARY OF THE INVENTION

It is an object of the present invention to provide an improved fuel injector.

It is another object of the present invention to provide a fuel injector having a compact construction and capable of handling high pressure fuel.

It is a further object of the present invention to provide a fuel injector improved in maintainability.

It is a still further object of the present invention to provide a fuel injector wherein the bouncing of a valve member is suppressed.

It is a still further object of the present invention to provide a liquefied gas fuel supply system having a high utility.

In one aspect of the present invention there is provided a fuel injector which is provided with an oil pressure reducing means. The oil pressure reducing means reduces an oil pressure acting in a nozzle hole closing direction which oil pressure is included in an oil pressure acting on a valve element. Since the oil pressure acting on a valve element in the nozzle hole closing direction is reduced, the force required for an electromagnetic drive unit to actuate the valve element decreases. Consequently, even when the valve element is actuated directly by the electromagnetic drive unit, the pressure of fuel fed to the fuel injection system concerned can be increased while retaining the constitution of the electromagnetic drive unit for example. Thus, even when the valve element is actuated directly by the electromagnetic drive unit, the pressure of injected fuel can be further increased without an increase in size of the constitution.

The above fuel injector according to the present invention is what is called an actuator direct acting type fuel injector wherein an armature is attracted to a stator upon energization of a coil and consequently a valve element integral with the armature moves to open the nozzle hole. In this construction, the valve element is provided in a divided manner into a rod portion and a valve portion, which are connected together through a connecting member. According to this construction, when the armature is attracted to the stator upon energization of the coil, the valve portion moves together with the rod portion to open or close the nozzle hole. With the rod portion, the valve portion and the connecting member connected to one another, the rod portion is accommodated in a first casing and the valve portion is accommodated in a second casing.

According to the above construction, if the first and second casings are disassembled and the connecting member is disconnected, it becomes possible to remove only the valve portion exclusive of the rod portion. Therefore, when the valve portion is to be replaced after a long-term use of the fuel injector, the replacing work efficiency is improved. As a result, it is possible to realize a construction superior in maintainability of an actuator direct acting type fuel injector.

In the above construction, when the coil is energized, the armature is attracted to the stator against the biasing force of a spring and the valve element moves to its closing position. In this case, since an oil pressure damper chamber is provided between an end face of the armature and that of the stator, the bouncing of the armature and valve element is suppressed when the valve opens by virtue of a damper effect. Therefore, it is possible to keep the fuel injection quantity under control.

According to the present invention, when an electric actuator (e.g., an electromagnetic solenoid or a piezoelectric actuator) causes an armature (driver) to displace in the valve opening direction, fuel having an accumulated pressure is injected from a nozzle. As a result of this injection, the pressure decreases on the nozzle side rather than in a throttle portion and the pressure in a second chamber becomes lower than that in a first chamber. Since the second chamber lower in pressure lies on the side (in the valve opening direction) opposite to the nozzle, a pressure receiving portion is urged to the opposite-to-nozzle side (in the valve opening direction) by virtue of a differential pressure. With this urging force based on the differential pressure, the bouncing of the valve element when opened is suppressed. When the electric actuator causes the armature to displace in the valve closing direction, the injection of fuel is stopped. Once the fuel injection is stopped, the flow of injected fuel is cut off suddenly, so that the pressure on the nozzle side rather than in the throttle portion increases to a higher level than the pressure of accumulated pressure fuel and the pressure in the second chamber becomes higher than that in the first chamber. At this time, the first chamber which is low in pressure lies on the nozzle side (in the valve closing direction), so that the pressure receiving portion is urged to the nozzle side (in the valve closing direction) by virtue of a differential pressure. With this urging force induced by the differential pressure, the bouncing of the valve element when closing is suppressed. Since the bouncing in valve opening and closing is thus suppressed, the injection characteristic is improved. Even in the case where the valve element is long and heavy, it is possible to improve the injection characteristic because the occurrence of bounce is suppressed by the differential pressure.

Further, even where the fuel viscosity is low as in such a liquefied gas fuel as LPG or DME, since the occurrence of bounce is suppressed by the differential pressure, it is possible to improve the injection characteristic.

According to a further feature of the present invention, fuel having an accumulated pressure is injected from the nozzle upon displacement of the armature in the valve opening direction by the electric actuator. With this fuel injection, the fuel flows from the first chamber to the second chamber formed on the side (in the valve opening direction) opposite to the nozzle through a passage formed along the side face of the armature. As a result of this fuel flow in the valve opening direction, the armature undergoes a force advancing toward the side (in the valve opening direction) opposite to the nozzle, whereby the bouncing of the valve body in valve opening is suppressed. When the electric actuator causes the armature to displace in the valve closing direction, the injection of fuel is stopped. Once the fuel injection is stopped, the flow of the injected fuel is cut off suddenly, so that the pressure on the nozzle side rather than in the throttle portion rises to a higher level than that of the accumulated pressure fuel which is fed and the pressure in the second chamber becomes higher than that in the first chamber. As a result, the fuel flows from the second chamber which is high in pressure to the first chamber located on the nozzle side (in the valve closing direction) through the passage formed along the side face of the armature. With this fuel flow in the valve closing direction, the armature undergoes a force advancing toward the nozzle side (in the valve closing direction), so that the bouncing of the valve element when closing is suppressed.

In another aspect of the present invention there is provided a fuel supply system for the supply of a liquefied gas fuel, in which a liquefied gas fuel stored in a fuel tank is fed through fuel piping to a fuel injection system.

In this system there is provided an air conditioner which is provided with at least an expansion valve, an evaporator, and a condenser, and a liquefied gas fuel stored in the fuel tank is fed as refrigerant to the air conditioner. Further, the liquefied gas fuel leaking from the fuel injection system is introduced into the air conditioner.

The liquefied gas fuel introduced into the air conditioner is mixed as refrigerant into the liquefied gas fuel which is circulating through the air conditioner, then flows downstream.

According to the above construction, the liquefied gas fuel leaking from, for example, a high pressure pump and a fuel injector both constituting the fuel injection system is subjected to a liquefying process in the air conditioner (condenser) and is returned to the fuel tank through the air conditioner. Thus, there is not required any additional construction as the fuel recovery system. Additionally, the condenser in the air conditioner plays the role of recovering the leak fuel in addition to its inherent role of liquefying the refrigerant (liquefied gas fuel) and thus the condenser can be used in common. As a result, it is possible to simplify the construction of the fuel supply system and reduce the cost thereof.

BREIF DESCRIPTION OF DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Plural embodiments of the present invention will be described hereinafter with reference to the accompanying drawings.

Figure 2:
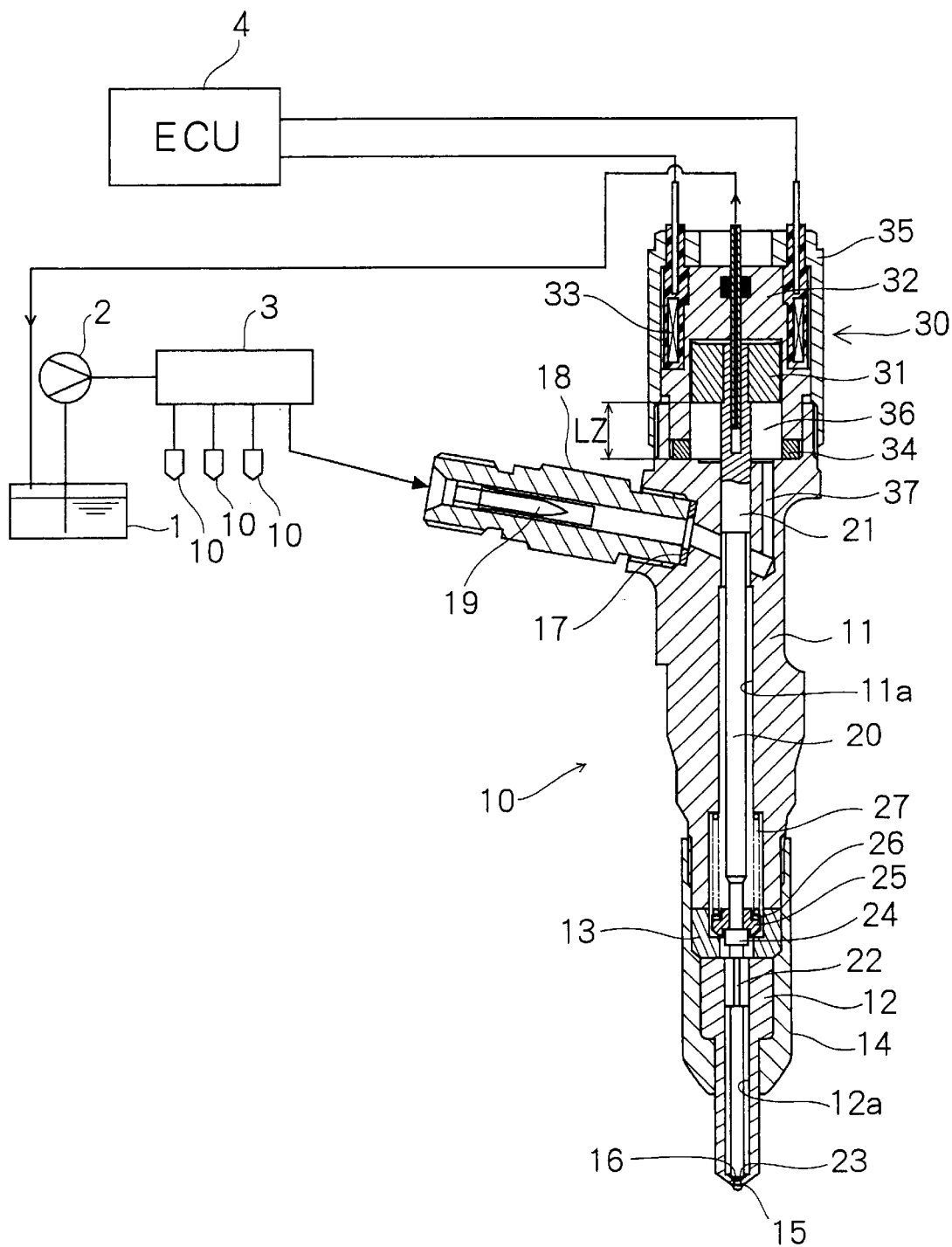
FIG. 2 is a block diagram of a fuel injection system according to the first embodiment of the present invention.

FIG. 2 shows an outline of a fuel injection system according to a first embodiment of the present invention. The fuel injection system of this embodiment is a common rail type fuel injection system in a diesel engine which uses DME as fuel.

DME stored in a fuel tank 1 is fed to a high pressure pump 2 by means of a low pressure pump (not shown). The DME fed to the high pressure pump 2 is pressurized by the same pump and then is fed to a common rail 3. In the common rail 3 is stored DME which has been accumulated at an injection pressure (50–80 MPa). Fuel injectors 10 in a number corresponding to the number of engine cylinders are connected to the common rail 3. The fuel injectors 10 are operated in accordance with drive signals provided from an ECU 4.

The fuel injectors 10 are each provided with a casing 11 and a valve body 12. The casing 11 and the valve body 12 are integrally clamped with a retaining nut 14 through a distance piece 13. The casing 11 and the valve body 12 are formed with coaxial holes 11a and 12a, respectively, into which a valve element 20 is received. The valve element 20 is formed as an axially extending rod, having two slide portions 21 and 22. Plural nozzle holes 15 are formed in a tip portion of the valve body 12. A valve seat portion 16 is provided on an inlet side of the nozzle holes 15 of the valve body 12. An abutment portion 23 capable of sitting on the valve seat portion 16 is provided at a tip of the valve element 20. When the abutment portion 23 sits on the valve seat portion 16, the flow of DME is shut off to stop the injection of fuel from the nozzle holes 15. On the other hand, when the abutment portion 23 leaves the valve seat portion 16, the flow of DME is allowed and is injected from the nozzle holes 15.

The valve element 20 has a large-diameter portion 24 at a position corresponding to the distance piece 13 which is an intermediate portion. In the large-diameter portion 24 are disposed a spring retainer 25 and a shim 26. A spring 27 is disposed between an inner wall of the casing 11 and the shim 26, whereby the valve element 20 is urged downward in FIG. 2, i.e., in a nozzle hole closing direction.

Figure 3:
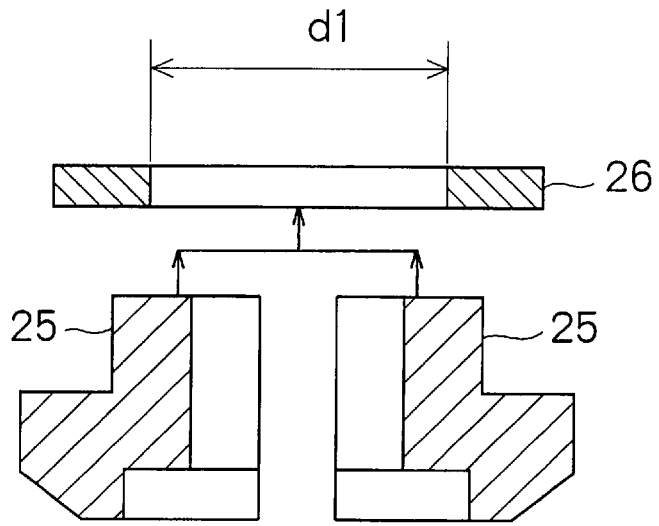
FIG. 3 is a sectional view showing an assembled state of components which constitute the injector according to the first embodiment of the present invention.
Figure 4:
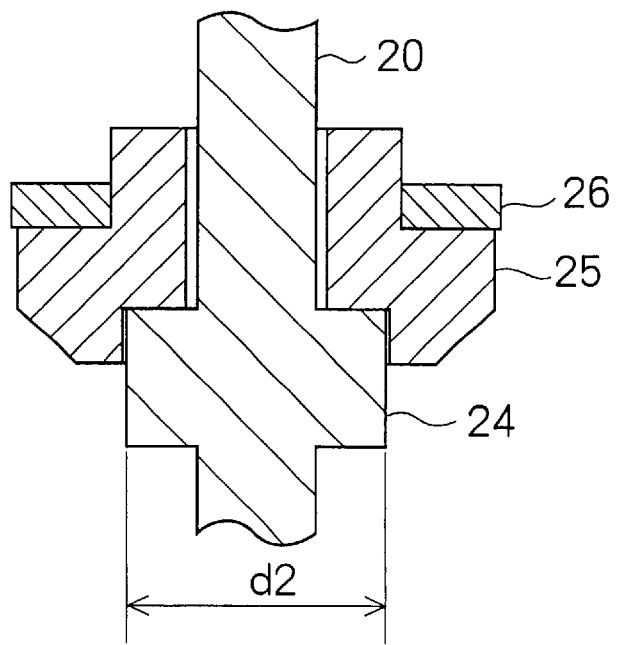
FIG. 4 is a partial sectional view of the injector according to the first embodiment of the present invention.

As shown in FIG. 3, the spring retainer 25 is constructed of two dividable pieces, while the shim 26 is formed by a ring-like plate. As shown in FIG. 4, the spring retainer 25 is mounted in a sandwich relation to the large-diameter portion 24 of the valve element 20, followed by mounting of the shim 26. As a result, the spring retainer 25 is clamped radially inwards by the shim 26 and is fixed to the valve element 20. The shim 26 fulfills a spring force adjusting function. That is, the biasing force of the spring 27 can be adjusted by adjusting the plate thickness of the shim 26.

As shown in FIG. 2, an inlet port member 18 is attached to the casing 11 through a gasket 17. The inlet port member 18 is connected to the common rail 3 and the high pressure DME is introduced from the common rail 3 into the holes 11a and 12a through the inlet port member 18. A filter 19 for removing foreign matters contained in DME is press-fitted into the inlet port member 18.

An electromagnetic drive unit 30 is installed in the casing 11 on the side opposite to the valve body. The electromagnetic drive unit 30 has an armature 31, a stator 32, and a coil 33. The armature 31 is fixed to an end portion of the valve element 20 on the side opposite to the nozzle holes integrally with the valve member. The stator 32 is disposed in opposition to the armature 31. The coil 33 is disposed on an outer periphery side of the stator 32. The coil 33, when supplied with electric power from ECU 4, generates a magnetic field. With the magnetic field generated by the coil 33, a magnetic attraction is developed between the stator 32 and the armature 31. In this embodiment, the valve element 20 is attracted in the nozzle hole opening direction by virtue of the magnetic attraction induced between the armature 31 and the stator 32 in the electromagnetic drive unit 30 and is actuated directly by the electromagnetic drive unit 30. That is, the fuel injector 10 of this embodiment is a direct acting type fuel injector. A shim 34 is disposed between the stator 32 and the casing 11. A cap housing 35 clamps and fixes the stator 32 to the casing 11 through the shim 34. On an inner periphery side of the stator 32 is formed an armature chamber in which the armature 31 is accommodated movably.

In mounting the electromagnetic drive unit 30 and the spring 27, the valve element 20 and the armature 31 which are integral with each other are inserted into the holes 11a and 12a as deep as possible downward in FIG. 2. In this state, the shim 26 and the spring 27 are mounted to the valve element 20 and the bisplit spring retainer 25 mounted in a bisplit state to the large-diameter portion 24 of the valve element 20. With the spring retainer 25 thus connected, the shim 26 is fitted thereon to fix the spring retainer. Thereafter, the distance piece 13 and the valve body 12 are fixed to the casing by means of the retaining nut 14. Further, the stator 32 and the shim 34 are fixed to an end portion of the casing 11 on the side opposite to the valve body by means of the cap housing 35, whereby the electromagnetic drive unit 30 is mounted to the casing 11.

In connection with mounting the electromagnetic drive unit 30 and spring 27 in accordance with the above procedure, an inside diameter d1 of the shim 26 is set larger than an outside diameter d2 of the large-diameter portion 24 of the valve element 20, as shown in FIGS. 3 and 4. For example, d1 is 4.1 mm and d2 is 4.0 mm. Therefore, the shim 26 can be fitted onto the large-diameter portion 24 from the opposite-to-armature side of the valve element 20. Further, in the armature chamber 36, as shown in FIG. 2, a sufficient distance LZ is ensured between an end face of the armature 31 on the casing 11 side and an end face of the casing 11 on the armature 31 side is ensured, whereby the valve element 20 can be easily inserted downward in FIG. 2 and the spring 27 and other components can be mounted easily.

Figure 1:
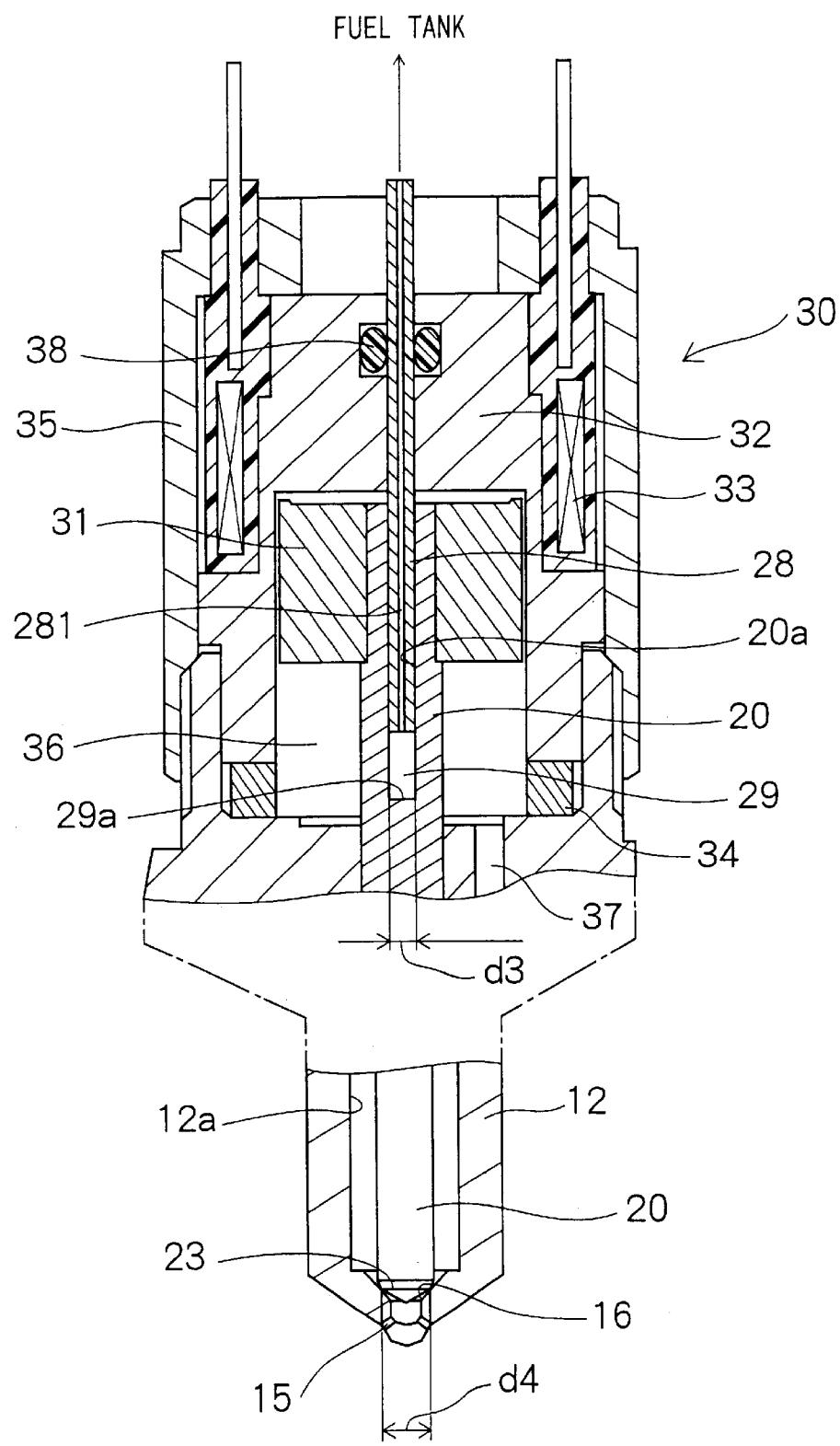
FIG. 1 is a partial sectional view of an injector according to a first embodiment of the present invention.

The armature chamber 36 with the armature 31 received therein is in communication with the hole 11a through a passage 37, whereby DME of a high pressure is introduced into the armature chamber 36 through the hole 11a. As shown in FIG. 1, a hole 20a is formed on the valve element 20 on the side opposite to the nozzle holes. A rod member 28 is provided on an inner periphery side of the hole 20a so as to be slidable with respect to an inner wall of the hole 20a. An oil pressure reducing means is constituted by both hole 20a and rod member 28. A space formed between the hole 20a and the rod member 28, i.e., a space formed in the hole 20a on the nozzle holes 15 side rather than on the rod member 28 side, serves as a low pressure chamber 29. The rod member 28 is formed with a communication hole 281 and one end thereof is in communication with the low pressure chamber 29, while the opposite end thereof is in communication with the fuel tank 1 shown in FIG. 2 which lies on the low pressure side.

Therefore, the internal pressure of the low pressure chamber 29 is almost equal (about 0.6 MPa) to that of the fuel tank 1. An O-ring 38 is installed between the rod member 28 and the stator 32 to prevent leakage of DME to the exterior from the armature chamber 36.

Since the inside diameter of the hole 20a and the outside diameter of the rod member 28 are almost equal to each other, the inner wall of the hole 20a and an outer wall of the rod member 28 slide with respect to each other. The rod member 28 is fixed to the stator 32 by press-fitting for example. Accordingly, when the armature 31 and the valve element 20 integral with each other reciprocate axially, the rod member 28, as well as the armature 31 and the valve element 20, reciprocate relatively with respect to each other, so that the volume of the low pressure chamber 29 changes.

The inside diameter of the hole 20a and the outside diameter of the rod member 28 are assumed to be d3, while the outside diameter of the valve element 20 and the inside diameter of the valve seat portion 16 of the valve body 12 opposed to the abutment portion 23 are assumed to be d4. If d3 and d4 are set equal to each other like, for example, d3=1.8 mm and d4=1.8 mm, the oil pressure based on the high pressure DME acting on the valve element 20 becomes balanced. Further, the force induced by the oil pressure of DME acting on the valve element 20 decreases by an amount corresponding to the area of an end face 29a of the low pressure chamber 29 located on the nozzle holes 15 side. Thus, it is possible to improve the pressure of DME injected from the fuel injector 10. For example, with d3=d4=1.8 mm, even when the pressure of DME is about 80 MPa, it is possible to actuate the valve element 20 without changing the constitution and output force of the electromagnetic drive unit 30 and the shapes of components.

it is possible to actuate the valve element 20 without changing the constitution and output force of the electromagnetic drive unit 30 and the shapes of components.

A small amount of DME present in the armature chamber 36 leaks out to the low pressure chamber 29 through the clearance between the hole 20a and the rod member 28. However, the flow rate of DME leaking out to the low pressure chamber 29 in this embodiment is extremely small in comparison with that in the fuel injector disclosed for example in JP-A-9-42106 in which high pressure fuel present in the pressure control chamber is allowed to leak to the low pressure side at every fuel injection. Therefore, the DME leaking to the low pressure chamber 29 can be recovered directly into the fuel tank 1.

Next, the following description is provided about the operation of the fuel injector 10 according to the first embodiment.

When electric power is fed from the ECU 4 to the coil 33, a magnetic attraction is developed between the armature 31 and the stator 32 by a magnetic field created in the coil 33. When the magnetic attraction developed between the armature 31 and the stator 32 becomes larger than the sum of both the biasing force of the spring 27 and the force based on the pressure in the holes 11a and 12a and acting on the valve element 20 in the nozzle holes closing direction, the armature 31 and the valve member 20 integral with the armature lift upward in FIG. 2. As a result, abutment portion leaves the valve seat portion 16 and the injection of fuel from the nozzle holes 15 is started.

When the supply of electric power to the coil 33 is stopped, the magnetic attraction between the stator 32 and the armature 31 vanishes. Consequently, the valve element 20 move downward in FIG. 2 with both the biasing force of the spring 27 and the force based on the pressure of DME and acting on the valve element 20 in the nozzle holes closing direction. As a result, the abutment portion 23 sits on the valve seat portion 16 and the injection of fuel from the nozzles holes 15 is stopped.

According to the fuel injector 10 of the first embodiment, as described above, the low pressure chamber 29 is formed in an end portion of the valve element 20 on the side opposite to the nozzle holes, whereby the force acting on the valve element 20 in the nozzle holes closing direction can be diminished. Further, by equalizing d3 to d4, it is possible to balance the pressure of DME acting on the valve element 20, and hence it is possible to decrease the force for actuating the valve element 20 in the nozzle holes opening direction. Accordingly, the pressure of DME injected can be made high without an increase in drive force of the electromagnetic drive unit 30 and without an increase in size of the constitution of the same drive unit.

In this first embodiment there is adopted a direct acting method wherein the valve element 20 is actuated directly by the electromagnetic drive unit 30, for example in comparison with a fuel injector wherein a valve member is actuated by controlling the oil pressure in a pressure control chamber, it is possible to greatly diminish the amount of DME discharged from the fuel injector 10 to the low pressure side. The adoption of the direct acting method is further advantageous in that the leakage of fuel can be diminished even when a high pressure liquefied gas fuel, e.g., DME, is used as fuel as in this first embodiment.

A description will be given below of a fuel injector according to a second embodiment of the present invention.

This second embodiment is a modification of the first embodiment and the construction of a fuel injector 10 according to this second embodiment is the same as that in the first embodiment. In the second embodiment the relation between d3 and d4 is different from that in the first embodiment, which relation is set as d3<d4. With d3<d4, the force based on the pressure of DME and acting on the valve element 20 is imbalanced and becomes larger in the nozzle holes closing direction. More specifically, for d4=1.8 mm, d3 is set smaller in accordance with the maximum pressure of DME which is injected. By the setting, the period from the time when the supply of electric power to the coil 33 is stopped until the abutment portion 23 sits on the valve seat portion 16 is shortened and the response characteristic of the valve element 20 in valve closing is improved.

Figure 10:
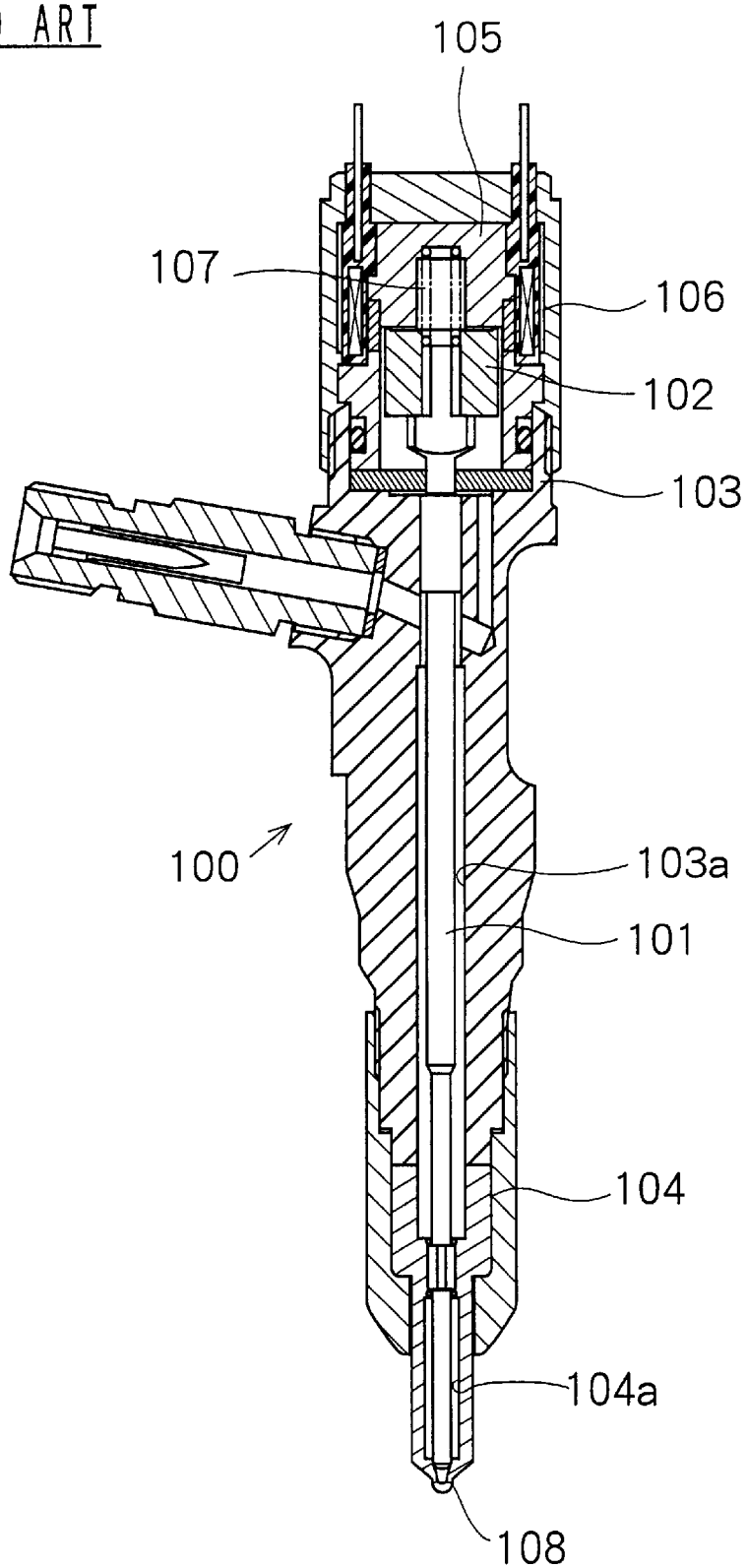
FIG. 10 is a sectional view of an injector according to a related art.

The value of d3 can be calculated in accordance with both d4 and maximum injection pressure of DME. For example, if the maximum injection pressure of DME is 80 MPa, then for d4=1.8 mm, the value of d3 is set in the range from 1.4 to 1.6 mm. By the setting, when the pressure of DME fed to the fuel injector 10 is 80 MPa, the force based on the pressure of DME and acting on the valve member corresponds, for example in the conventional fuel injector 100 shown in FIG. 10, to the force which acts on the valve member 101 when the pressure of DME is in the range from about 15 to 30 MPa.

According to this second embodiment, the force acting on the valve element 20 can be decreased even when the pressure of DME is improved. Besides, the spring 27 is disposed between the large-diameter portion 24 of the valve element 20 and an end face of the casing 11, for example in comparison with the spring 107 in the conventional fuel injector 100 shown in FIG. 10, the spring 27 used in this embodiment is disposed apart from the stator 32, thus permitting easy insertion of the rod member 28 into the stator 32. Therefore, it is easy to change the inside diameter of the hole 20a and the outside diameter of the rod member 28 and hence the value of d3 can be changed easily.

Figure 5:
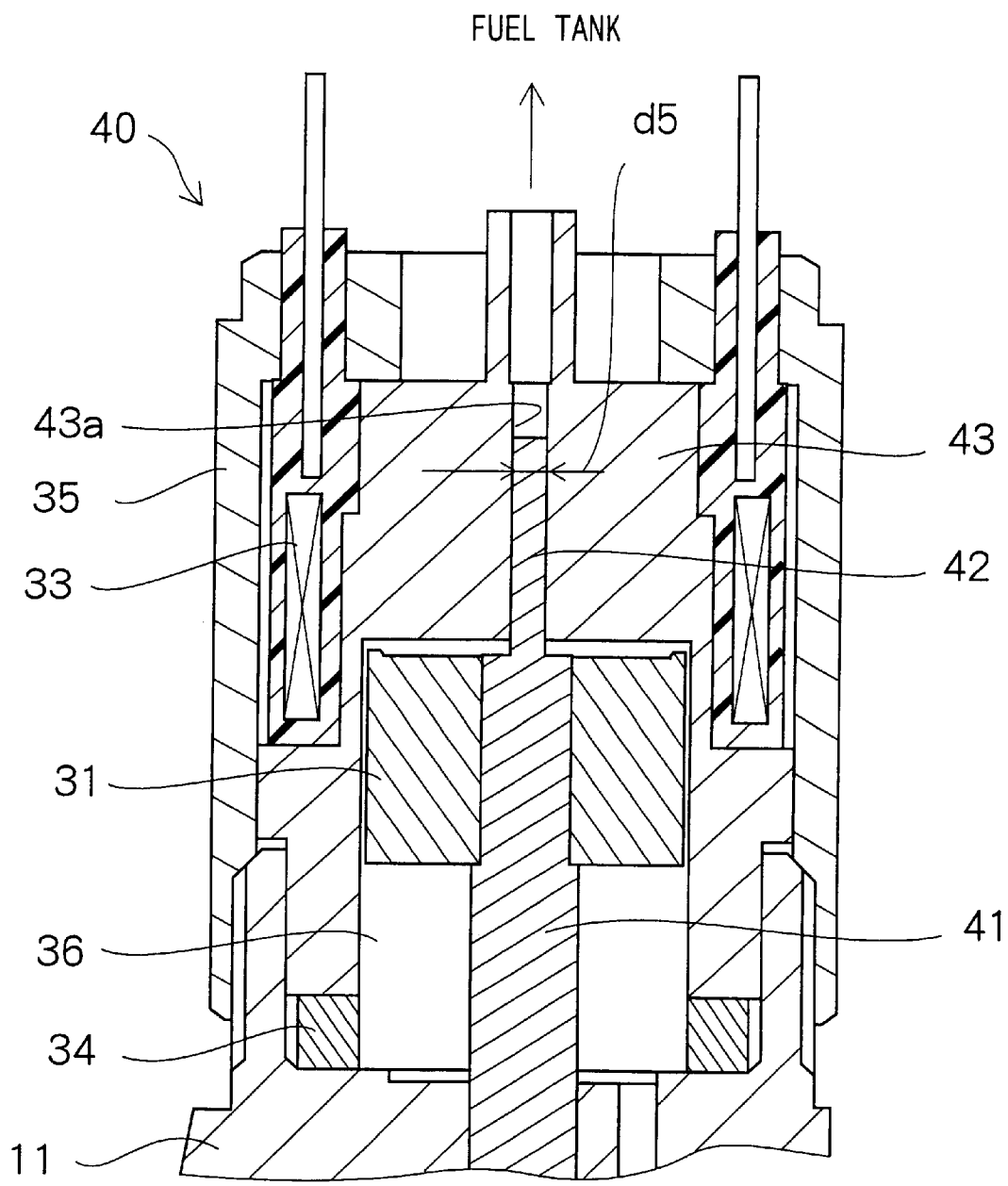
FIG. 5 is a partial sectional view of an injector according to a third embodiment of the present invention.

A fuel injector according to a third embodiment of the present invention is shown in FIG. 5, in which components substantially common to the first embodiment are identified by like reference numerals, and explanations thereof will here be omitted.

In a fuel injector 40 according to this third embodiment, as shown in FIG. 5, a small-diameter portion 42 is formed at an end portion of a valve element 41 on the side opposite to nozzle holes. The small-diameter portion 42 is integral with the valve element 41 and extends to the opposite-to-nozzle-holes side of the valve element. A hole 43a is formed in a stator 43 and the small-diameter portion 42 can slide and reciprocate on an inner periphery side of the hole 43a. The hole 43a is in communication with a fuel tank 1 which corresponds to a low pressure side. According to this construction, a pressure equal to the internal pressure of the fuel tank 1 acts on an end face of the small-diameter portion 42 and also on the hole 43a as is the case with the low pressure chamber 29 in the first embodiment. An outside diameter of the small-diameter portion 42 and an inside diameter of the hole 43a, which are indicated at d5, are set so as to meet the relationship of d5≦d4 like d3 in the second embodiment. The amount of DME leaking out from the clearance between the small-diameter portion 42 and the hole 43a is very small, so that the leaking fuel is recovered directly into the fuel tank 1.

In this third embodiment, the pressure of DME acting on the valve element 41 in the valve closing direction can be reduced as in the first embodiment, thus making it possible to diminish the force required for actuating the valve element 41.

Figure 6:
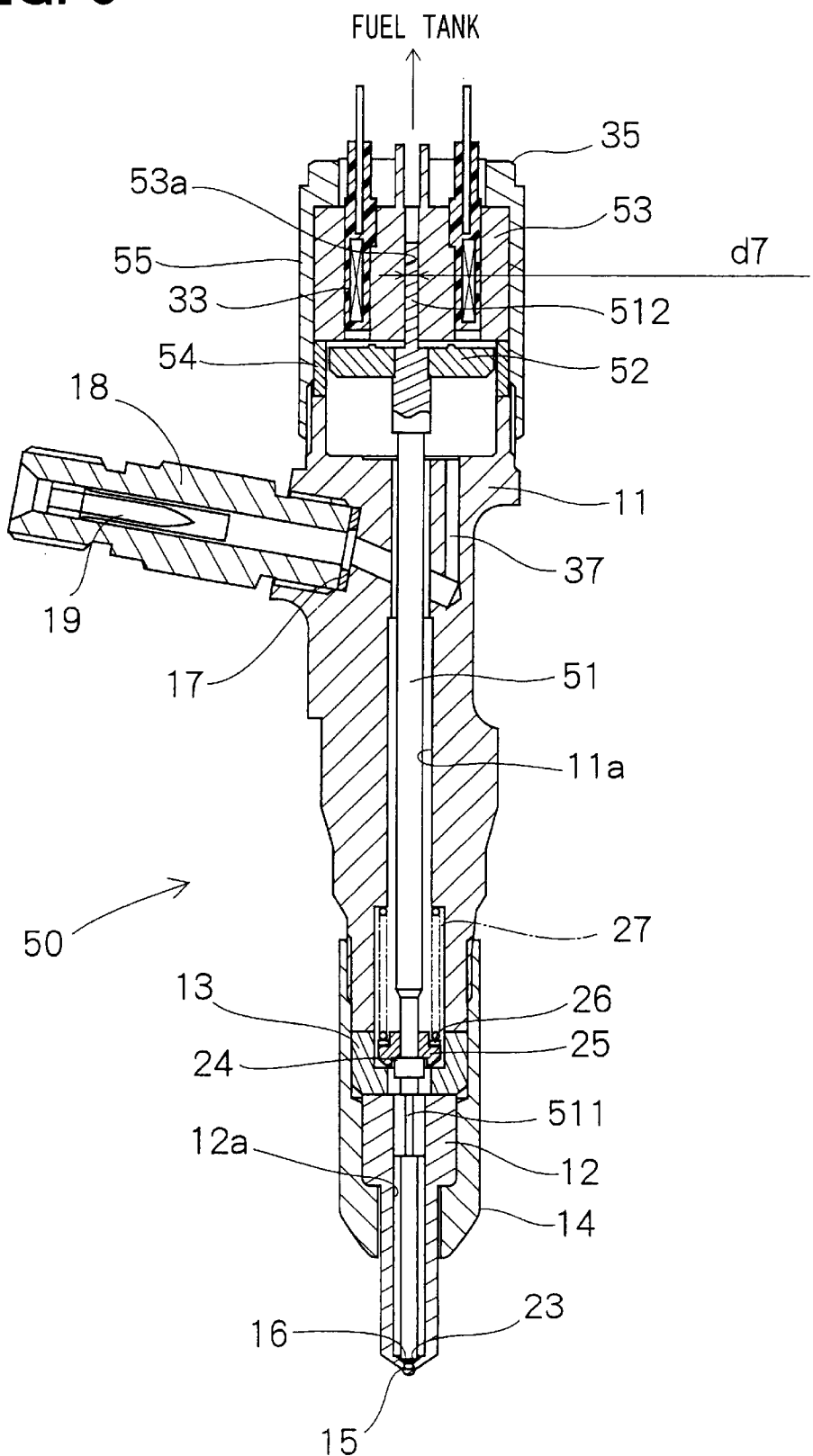
FIG. 6 is a sectional view of an injector according to a fourth embodiment of the present invention.

A fuel injector according to a fourth embodiment of the present invention is shown in FIG. 6, in which components substantially common to the first embodiment are identified by like reference numerals, and explanations thereof will here be omitted.

In a fuel injector 50 according to this fourth embodiment, as shown in FIG. 6, an armature 52 fixed to an end portion of a valve element 51 on the side opposite to nozzle holes is formed in the shape of a flat plate. A stator 53 is provided in opposition to the armature 52. A shim 54 is disposed between the stator 53 and a casing 11. A cap housing 55 clamps and fixes the stator 53 to the casing 11 in a sandwiching relation to the shim 54. The valve element 51 is provided with a slide portion 511. The slide portion 511 is slidable with respect to an inner wall of a hole 12a formed in a valve body 12.

At an end portion of the valve element 51 on the side opposite to nozzle holes there is formed a small-diameter portion 512 integrally with the valve element 51. The small-diameter portion 512 can slide and reciprocate along an inner periphery side of a hole 53a formed in the stator 53. The hole 53a is in communication with a fuel tank 1 which corresponds to a low pressure side. According to this construction, a pressure equal to the internal pressure of the fuel tank 1 acts on the hole 53a and also on an end face of the small-diameter portion 512. An inside diameter of the hole 53a and an outside diameter of the small-diameter portion 512, which are indicated at d7, are set so as to meet the relationship of d7≦d4 like d3 in the first or the second embodiment. The amount of fuel leaking out from the clearance between the small-diameter portion 512 and the hole 53a is very small, so that the leaking DME is recovered directly into the fuel tank 1.

In this fourth embodiment, the valve element 51 slides with respect to the valve body 12 or the stator 53 at two portions of slide portion 511 and small-diameter portion 512. In comparison with the first embodiment wherein the valve member slides at three portions of slide portion 21, slide portion 22, and hole 20a, the management of coaxiality of components can be done easily in this fourth embodiment.

Figure 7:
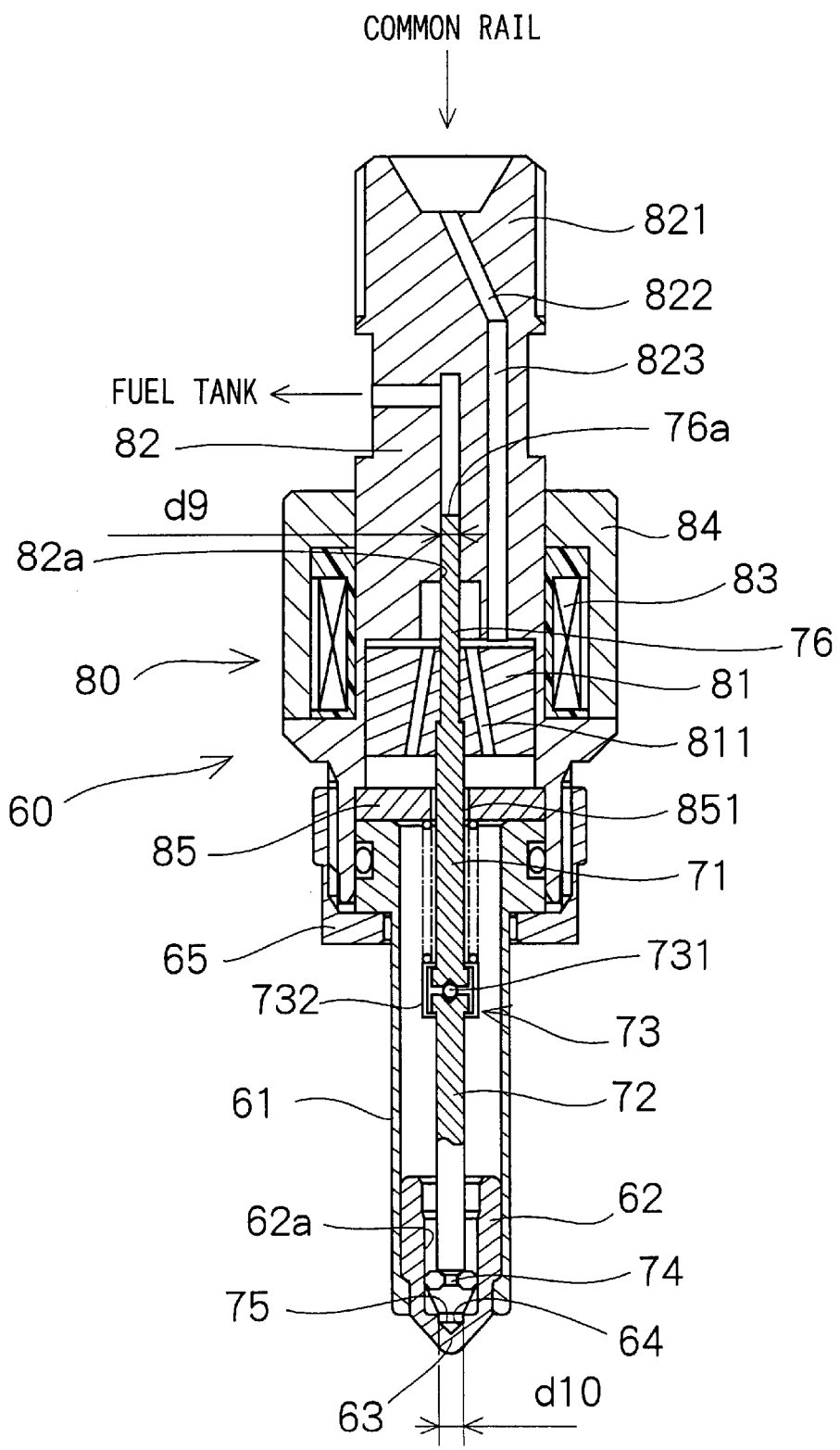
FIG. 7 is a sectional view of an injector according to a fifth embodiment of the present invention.

A fifth embodiment of the present invention is shown in FIG. 7.

In a fuel injector 60 according to this fifth embodiment, a valve element is constructed of a valve rod portion 71 and a valve needle portion 72, which are connected together by a connecting portion 73. The connecting portion 73 has a spherical ball 731 and a fixing member 732. A valve body 62 is fixed to one end portion of a casing 61 and an electromagnetic unit 80 is fixed to an opposite end portion of the casing. A hole 62a is formed in the valve body 62 and a slide portion 74 and a slide portion 74 formed on the valve needle portion 72 is slidable with respect to an inner wall of the hole 62a. Plural nozzle holes 63 are formed in a tip end portion of the valve body 62. A valve seat portion 64 is provided on an inlet side of the nozzle holes 63 of the valve body 62. An abutment portion 75 capable of sitting on the valve seat portion 74 is provided at a tip of the valve needle portion 72. When the abutment portion 75 sits on the valve seat portion 64, the flow of DME is cut off to stop the injection of DME from the nozzle holes 63. On the other hand, when the abutment portion 75 leaves the valve seat portion 64, the flow of DME is started and DME is injected from the nozzle holes 63.

An electromagnetic drive unit 80 is installed on the casing on the side opposite to the valve body. The electromagnetic drive unit 80 has an armature 81, a stator 82, a coil 83, and a cap housing 84. The armature 81 is formed integrally with the valve rod portion 71 on the side opposite to the nozzle holes. The stator 82 is disposed in opposition to the armature 81. The coil 83 is disposed on an outer periphery side of the stator 82. The coil 83, when supplied with electric power from ECU 4, generates a magnetic field. With the magnetic field thus generated by the coil 83, there occurs a magnetic attraction between the stator 82 and the armature 81. By energizing the coil 83, the valve rod portion 71 and the valve needle portion 72 as valve components are actuated directly by the electromagnetic drive unit 80. A cap housing 84 is provided in a surrounding relation to an outer periphery side of the coil 83 and forms a magnetic circuit in cooperation with both armature 81 and stator 82. The stator 82 and the casing 61 are fixed with a retaining nut 65 through a shim 85.

DME of a high pressure fed from a common rail 3 flows into an intake port 821 formed in the stator 82. The DME having thus entered the intake port 821 then flows through flow passages 822 and 823 formed eccentrically with respect the central axis of the stator 82, further through a flow passage 811 formed in the armature 81 and a flow passage 851 formed in the shim 85, and is fed to the tip end portion of the valve body 62.

A small-diameter portion 76 is formed at an end of the valve rod portion 71 on the side opposite to nozzle holes.

The small-diameter portion 76 is formed integrally with the valve rod portion 71 and extends to the side opposite to nozzle holes. A hole 82a is formed in the stator 82 and the small-diameter portion 76 can slide and reciprocate along an inner periphery side of the hole 82a. The hole 82a is in communication with a fuel tank 1 which corresponds to a low pressure side. According to this construction, a pressure equal to the internal pressure of the fuel tank 1 acts on the hole 82a and also on an end face 76a of the small-diameter portion 76. If an outside diameter of the small-diameter portion 76 and an inside diameter of the hole 82a are assumed to be d9 and an inside diameter of the valve seat portion 64 in the valve body 62 and an outside diameter of the abutment portion 75 in the valve needle portion 72 are assumed to be d10, there exists a relationship of $d9 \leq d10$ as in the first and second embodiments. Since the amount of DME leaking out from the clearance between the small-diameter portion 76 and the hole 82a is very small, the leaking fuel is recovered directly into the fuel tank 1.

A detailed description will be given below about the valve element used in the fuel injector 60 of this embodiment.

Figure 8:
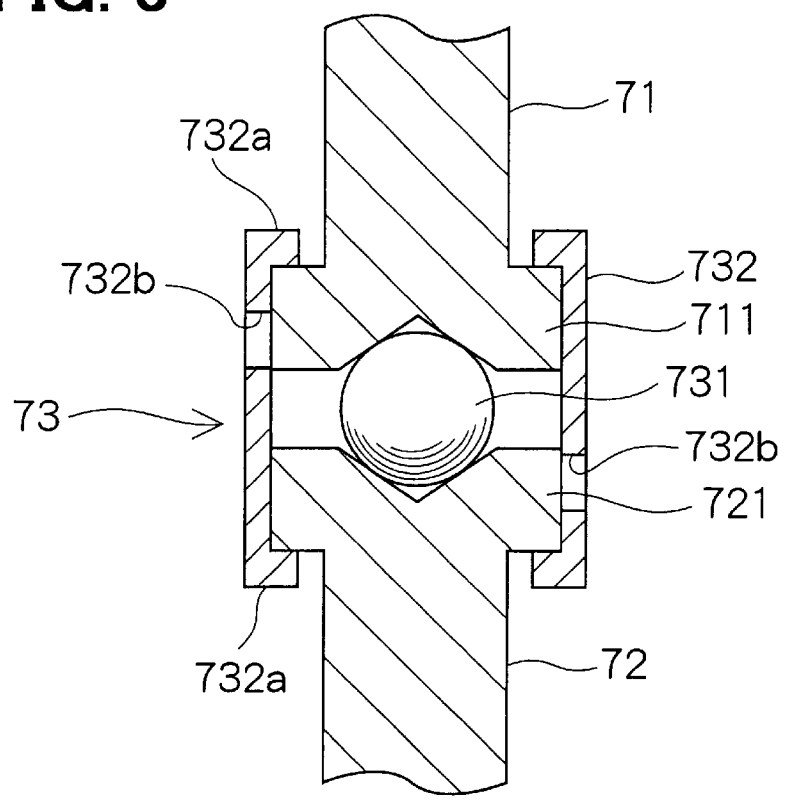
FIG. 8 is a partial sectional view of the injector according to the fifth embodiment of the present invention.

As shown in FIG. 8, the valve element has a valve rod portion 71 and a valve needle portion 72, which are connected together by a connecting portion 73. An end face of the valve rod portion 71 on the valve needle portion 72 side and an end face of the valve needle portion 72 on the valve rod portion 71 side are each formed in a centrally recessed conical shape and a ball 731 is held within the recessed space. The valve rod portion 71 and the valve needle portion 72 are formed with projecting portions 711 and 721, respectively, which project radially outwards, and a fixing member 732 is engaged with the projecting portions 711 and 712. At both axial ends of the fixing member 732 are formed a pair of retaining portions 732a, which are engaged with the projecting portions 711 and 712 of the valve rod portion 71 and the valve needle portion 72, respectively.

Figure 9:
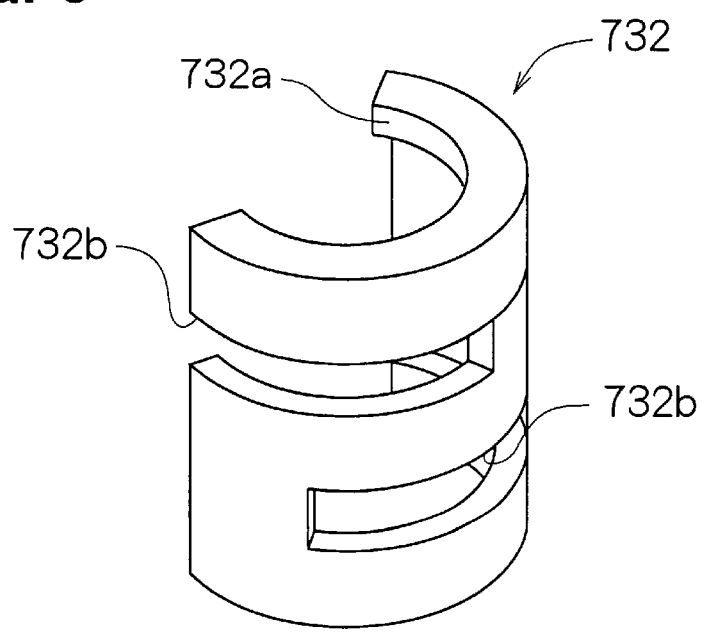
FIG. 9 is a partial sectional view of the injector according to the fifth embodiment of the present invention.

The fixing member 732 is formed of a metallic material such as steel and has a generally C-shaped section obtained by removing a part of a cylinder as shown in FIG. 9. The fixing member 732 can be fitted on the connection of the valve rod portion 71, valve needle portion 72 and ball 731 radially from the outside and can be removed from the connection. Further, the fixing member 732 is formed with plural slits 732b to make the overall axial length changeable.

The reason why the plural slits 732b are formed in the fixing member 732 and the fixing member 732 is made capable of expansion and contraction axially is as follows.

The fuel injector 60 is usually replaced when a running distance of a vehicle with a diesel engine mounted thereon reaches a predetermined distance (about 100,000 km). Taking the cost of replacement of the fuel injector 60 into account, it is desirable to replace only the casing 61, valve body 62 and valve needle portion 72 which are high in the frequency of wear or loss. In this embodiment wherein the valve rod portion 71 and the valve needle portion 72 are constituted as separate portions, there occur variations in size of both portions. Consequently, there is a fear that the lift quantity of the valve rod portion 71 and the valve needle portion 72 as constituents of the valve element, i.e., the spacing between the armature 81 and the stator 82, may vary after the replacement of parts. Thus, it is necessary that the spacing between the armature 81 and the stator 82 be adjusted by changing the size of the ball 731, and it is desirable that the fixing member 732 expand or contract according to the size of the ball 731. For this reason the fixing member 732 is constituted so as to be capable of expansion and contraction.

In this fifth embodiment the ball 731 is interposed between the valve rod portion 71 and the valve needle portion 72, so even when the valve rod portion 71 or the valve needle portion 72 tilts due to a machining error for example, it is possible to connect the valve rod portion 71 and the valve needle portion 72 with each other while accepting the tilt by the ball 731. Thus, a high machining accuracy is not required of the valve rod portion 71 or the valve needle portion 72 and hence it is possible to reduce the number of machining steps and the machining cost.

In the above plural embodiments DME is used as fuel introduced into the respective fuel injectors. In the present invention, however, there also may be used as fuel another liquefied gas fuel such as LPG or an ordinary liquid fuel such as gas oil or gasoline. Also as to the fuel injection system, it is not limited to the common rail type.

Next, a sixth embodiment of the present invention will be described. In this embodiment the present invention is applied to a fuel injector for a vehicular diesel engine wherein a liquefied gas such as DME or LPG is used as fuel.

The fuel injector according to this embodiment is what is called a direct acting type fuel injector wherein a valve element is directly operated by means of an electromagnetic solenoid (actuator).

Figure 11:
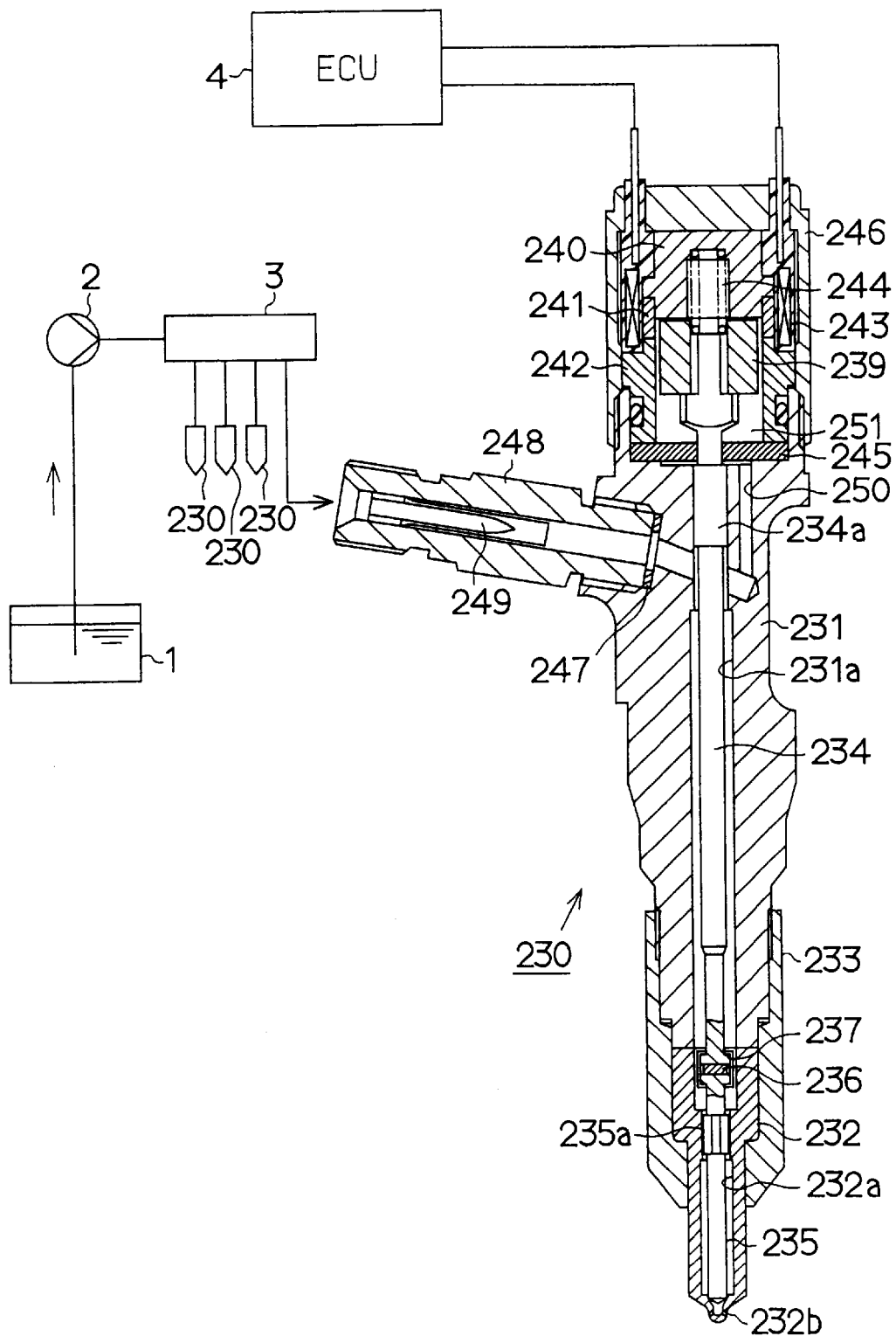
FIG. 11 is a sectional view of an injector according to a sixth embodiment of the present invention.

FIG. 11 illustrates a sectional structure of the fuel injector and a construction around the same injector. The fuel injector, indicated at 230, is actuated in accordance with a drive signal provided from ECU 4.

The construction of the fuel injector 230 will now be described in detail. A casing 231 and a valve body 232 constitute a first casing member and a second casing member respectively, which are rendered integral with each other by tightening a retaining nut 233. Coaxial holes 231a and 232a are formed in the casing 231 and 232, respectively, and a rod (rod portion) 234 and a valve (valve portion) 235, which constitute a valve element, are received into the holes 231a and 232a. A slide portion 234a of the rod 234 is in contact with an inner wall of the hole 231a, while a slide portion 235a of the valve 235 is in contact with an inner wall of the hole 232a, the rod 234 and the valve 235 being slidable vertically in the figure. A space adjusting shim (shim member) 236 is interposed between the rod 234 and the valve 235, and in this state these components are connected together by means of a fixing member 237 which serves as a connecting member. The valve member construction comprising the rod 234, valve 235, shim 236, and fixing member 237 is a characteristic portion of this embodiment and the details thereof will be described later.

Plural nozzle holes 232b are formed in a tip portion of the valve 232. The nozzle holes 232b close when a tip of the valve 235 comes into abutment against the valve body 232 and open when the tip of the valve 235 leaves the valve body 232.

In an electromagnetic solenoid section, an armature 239 is fixed to an upper end in the figure of the rod 234 and a first stator 240 is provided in opposition to the armature 239. A second stator 242 is attached to the first stator 240 through an insert member 241 which is formed of a non-magnetic material such as SUS304. These components are rendered integral in an oil-tight manner by such means as laser welding. A coil 243 is mounted on an outer periphery of the first stator 240. Further, a spring 244 is received in the first stator 240 and the valve element comprising the rod 234 and the valve 235 is urged to the valve closing side (lower side in the figure).

A plate 245 is disposed between the second stator 242 and the casing 231 and in this state a cap housing 246 is mounted to the casing 231. The plate 45 also functions as a valve stopper and the lift quantity of the rod 234 (valve 235) is restricted by abutment of an upper surface of the slide portion 234a of the rod 234 against the plate 245.

An inlet port member 248 is attached to the casing 231 in a sandwiching relation to a gasket 247. Fuel of a high pressure is introduced from a common rail into the holes 231a and 232a through the inlet port member 248. A bar filter 249 for preventing the entry of foreign matters is press-fitted and fixed into the inlet port member 248.

The hole 231a is in communication with an armature chamber 251 through a communication passage 250. Therefore, the high pressure fuel acts on the rod 234 and the valve 235 at any position and it is possible to prevent the leakage of fuel from high to low position in the associated slide portion.

In the fuel injector 230 of the above construction, when the coil 243 is de-energized, the valve element (rod 234 and valve 235) is held in its closed position with the biasing force of the spring 244. At this time, the nozzles holes 232b close and the fuel injection by the fuel injector 230 is stopped. When the coil 243 is energized, the armature 239 is attracted to the first stator 240 and the valve element (rod 234 and valve 235) moves to the valve opening side (upward in the figure) against the biasing force of the spring 244, whereby the nozzle holes 232b are opened to effect fuel injection.

Figure 12:
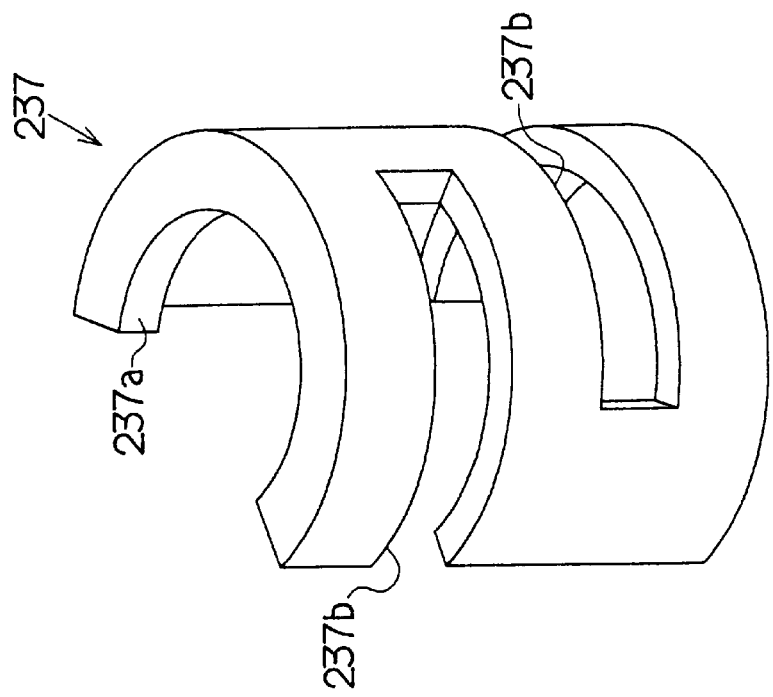
FIG. 12 is a perspective view of components of the injector according to the sixth embodiment of the present invention.

A detailed description will be given below about a characteristic construction of the valve element. FIG. 12 is a sectional view showing the connection between the rod 234 and the valve 235 on a larger scale and FIG. 13 is a perspective view showing the construction of the fixing member 237.

As shown in FIG. 12, a lower end face of the rod 234 and an upper end face of the valve 235 are both flat faces and the shim 236, which is in the shape of a flat plate, is interposed between both flat end faces. The rod 234 and the valve 235 are formed with outwardly projecting flange portions 234b and 235b, respectively, and the fixing member 237 is mounted so as to engage the flange portions 234b and 235b. That is, the fixing member 237 as a pair of upper and lower engaging portions 237a.

Figure 13:
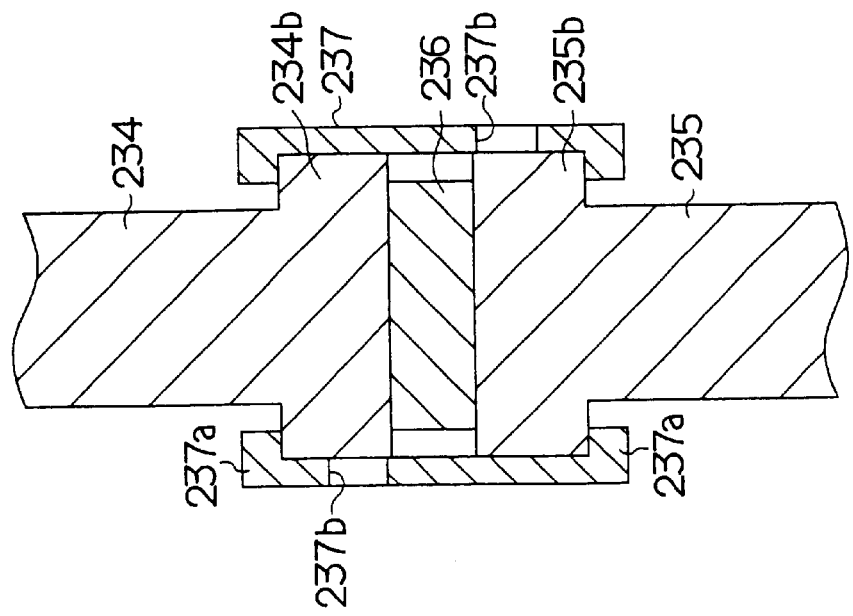
FIG. 13 is a partial sectional view of the injector according to the sixth embodiment of the present invention.

As shown in FIG. 13, the fixing member 237 is formed of a metallic material such as iron or steel and is in a C-shape in plan obtained by removing a part of a cylinder. The fixing member 237 can be fitted on the connection of the rod 234, valve 235 and shim 236 from the outside and can be removed. In the fixing member 237 are formed plural slits (expanding/contracting portions) 237b so as to make the axial length of the fixing member changeable.

The reason why the fixing member 237 is given the expanding/contracting function by the slits 237b will be set forth below.

Generally, the fuel injector 230 is replaced at every predetermined running distance of the vehicle concerned (at every about 100,000 km), and from the standpoint of cost it is only the nozzle portion (valve body 232 and valve 235) that is replaced. In this case, according to the above construction wherein the valve element is divided into rod 234 and valve 235, there occur variations in size of those components and this is presumed to be a cause of a change in valve lift quantity (an air gap quantity between the armature and the stator) after the replacement of parts. Thus, there arises the necessity of changing the thickness of the shim 236 to adjust the spacing, and the fixing member 237 is given a function of expansion and contraction so that it can cope with a change in thickness of the shim 236.

Figure 14:
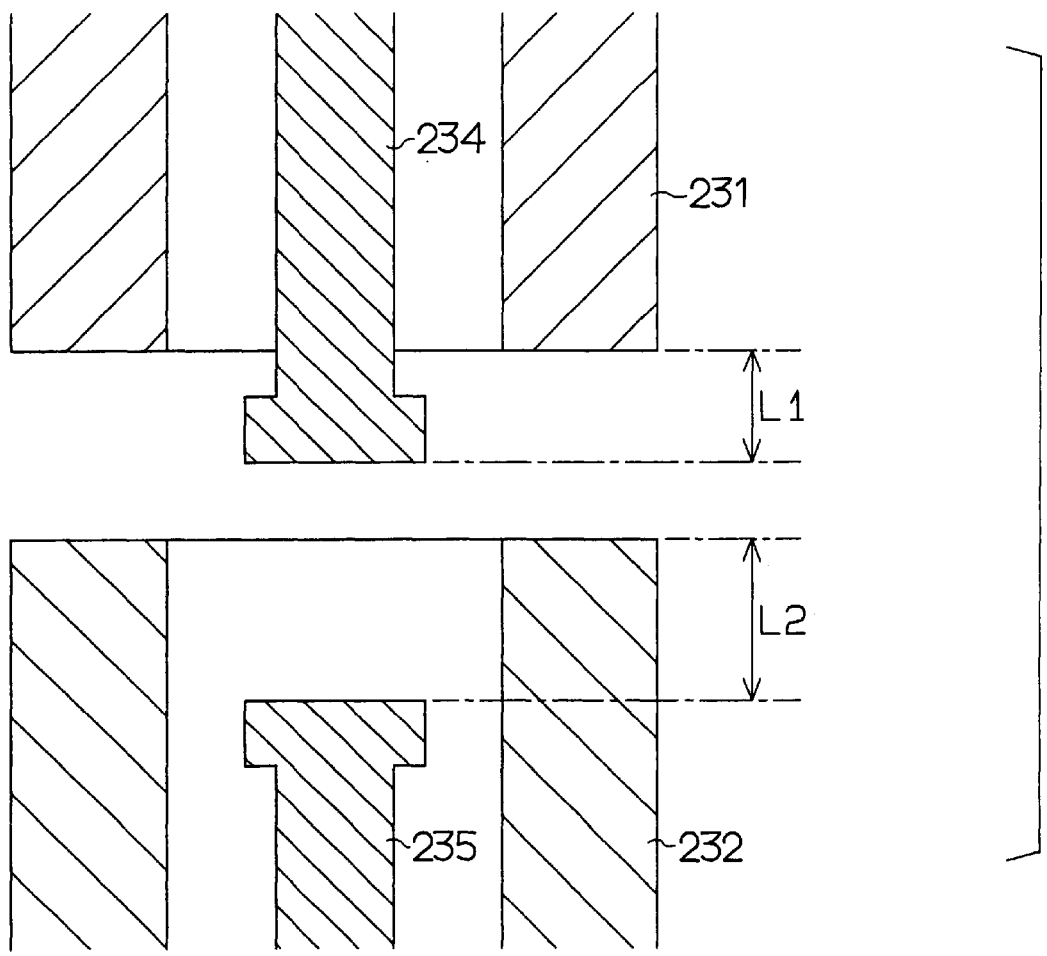
FIG. 14 is a partial sectional view of the injector according to the sixth embodiment of the present invention.

More specifically, in FIG. 14 which shows the connection of rod 234 and valve 235 in a disassembled manner, if the distance between an lower end face of the casing 231 and that of the rod 234 is assumed to be L1 and the distance between an upper end face of the valve body 232 and that of the valve 235 is assumed to be L2, the distance L1 is measured in an abutted state of the rod 234 against the plate 245. Likewise, for (new) valve body 232 and valve 235 after replacement, the distance L2 is measured in an abutted state of the tip of the valve 235 against the sheet portion of the valve body 232. Then, a required thickness of the shim 236 is determined from the distances L1 and L2.

In replacing the nozzle portion (valve body 232 and valve 235), the retaining nut 233 is released and the valve body 232 is removed. Further, the fixing member 237 is removed and the valve 235 is removed from the rod 234. Now, the removal of the used nozzle portion (valve body 232 and valve 235) is completed. Then, the distances L1 and L2 shown in FIG. 14 are measured in the manner described above and a shim 236 matching the measured values is provided, thereafter, a new nozzle portion (valve body 232 and valve 235) is mounted. The mounting may be done in reverse procedure from the dismounting procedure.

According to this embodiment described above in detail there are obtained the following effects.

When the valve portion is to be replaced after a long-term use of the fuel injector 230, the efficiency of the replacing work is improved. As a result, in the actuator direct acting type fuel injector 230, there can be realized a construction superior in maintainability.

Since the shim 236 is interposed between the rod 234 and the valve 235 and these components are interconnected by the fixing member 237 having an expanding/contracting function, even if the thickness of the shim 236 is changed, it is possible to cope with the change.

Since the rod 234, valve 235 and shim 236 are abutted and connected together at respective flat faces, even if the central axes of the rod 234 and valve 235 are slightly deviated due to a machining error for example, the rod 234 and the valve 235 can be connected together while accepting (absorbing) the deviation.

Since the fuel injector 230 described above is of an actuator direct acting type construction, there is little leakage of fuel and the fuel injector can be embodied suitably as a fuel injector for a liquefied gas fuel.

Figure 15:
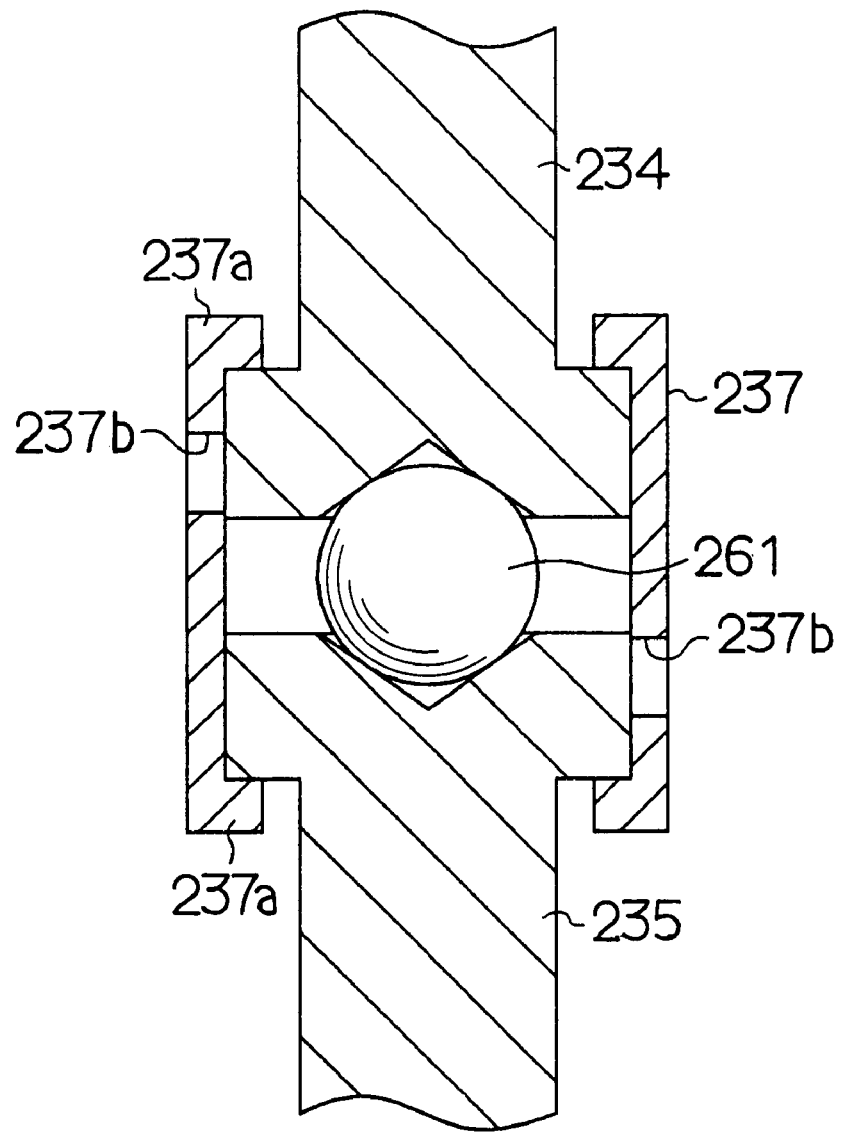
FIG. 15 is a partial sectional view of the injector according to a seventh embodiment of the present invention.
Figure 16:
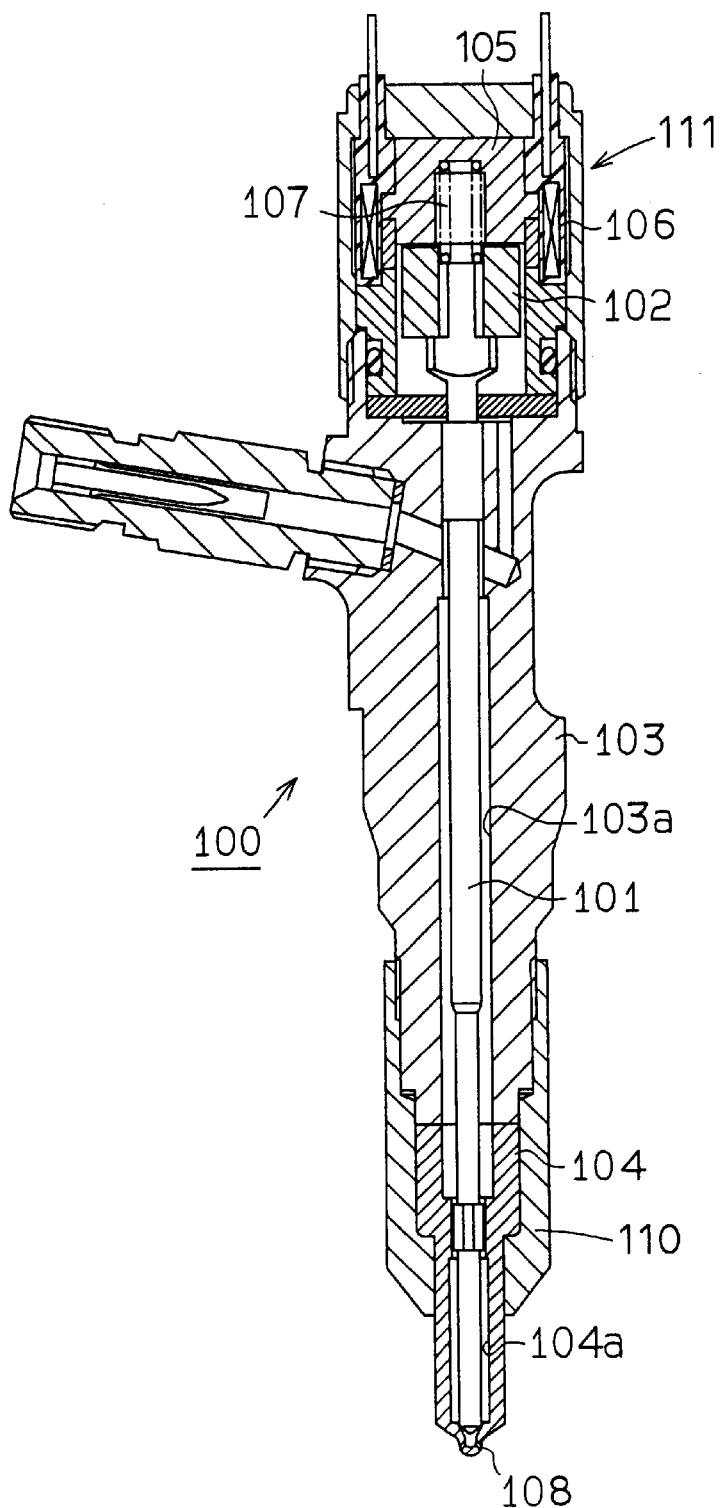
FIG. 16 is a sectional view of an injector according to a related art.

A seventh embodiment of the present invention will now be described. FIG. 15 is a sectional view showing a connection between a rod 234 and a valve 235 on a larger scale. In the construction illustrated in FIG. 15, a lower end face of the rod 234 and an upper end face of the valve 235 are in the shape of a centrally recessed cone, with a spherical ball 261 as a shim being interposed therebetween. By changing the size (diameter) of the ball 261 there is adjusted a valve lift quantity (air gap quantity between an armature and a stator). In this case, even if the connection between the rod 234 and the valve 235 tilts slightly due to a machining error for example, the rod 234 and the valve 235 can be connected together while accepting the tilt.

Although in the above embodiments the present invention is embodied as fuel injectors for the injection of a liquefied gas fuel such as DME or LPG, the present invention may also be applied to fuel injectors which inject other fuels. For example, the invention may be embodied as a fuel injector for the injection of gas oil or gasoline. Also in this case it is possible to realize a construction superior in maintainability.

Figure 17:
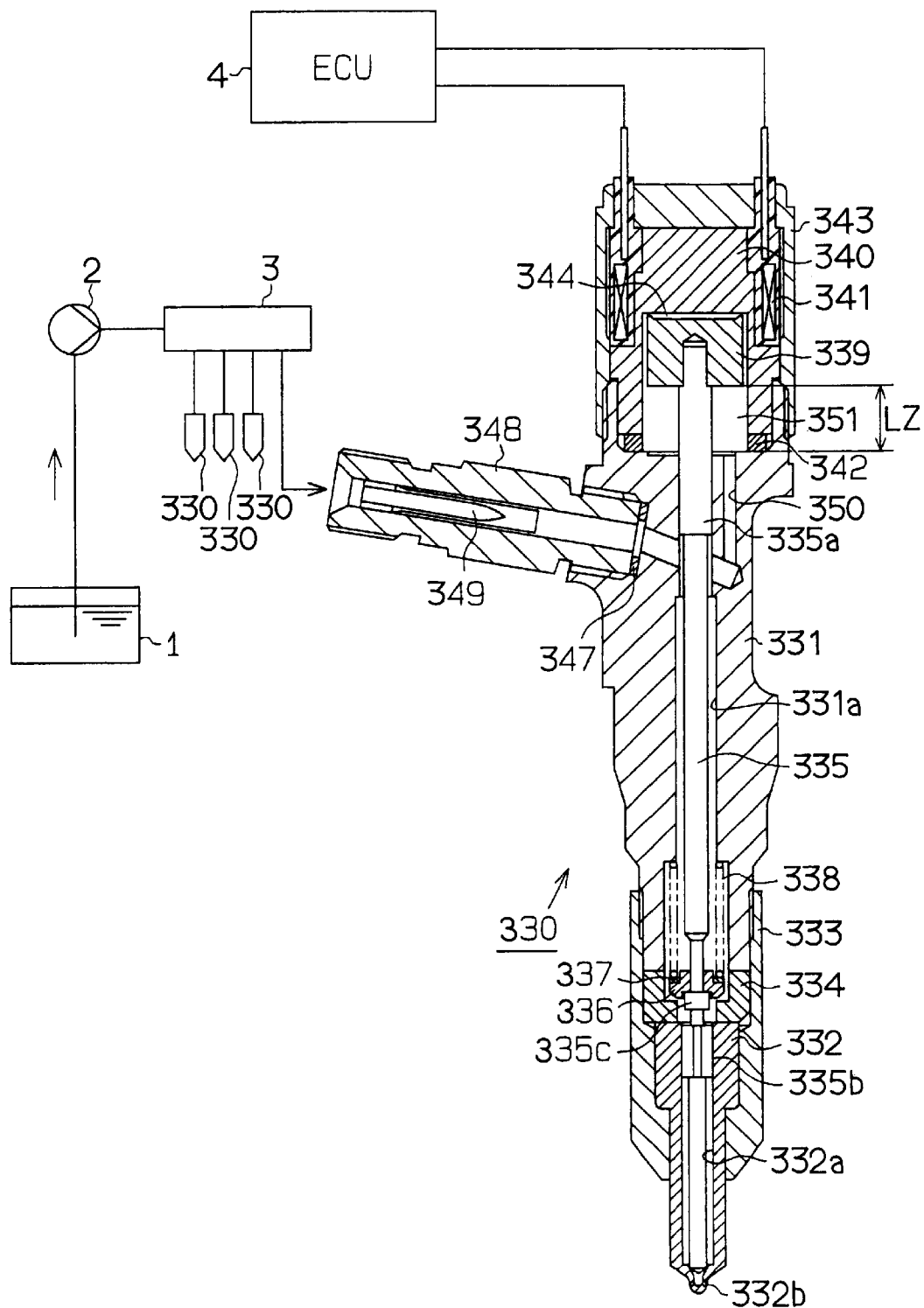
FIG. 17 is a sectional view of an injector according to an eighth embodiment of the present invention.

Next, an eighth embodiment will now be described. FIG. 17 illustrates a sectional structure of a fuel injector according to this embodiment and a construction around the fuel injector.

A detailed description will now be given about the construction of the fuel injector. A casing 331 and a valve body 332 constitute a dividable casing member. Both are rendered integral with each other by tightening a retaining nut 333. A part (a lower end portion in the figure) of the casing 331 is constituted in a divided form as a distance piece 334. Coaxial holes 331a and 332a are formed in the casing 331 and the valve body 332, respectively, and an elongated valve element 335 is received therein. The valve element 335 has slide portions 335a and 335b at two upper and lower positions in the figure. Plural nozzle holes 332b are formed in a tip portion of the valve body 332. When a tip of the valve element 335 comes into abutment against the valve body 332, the nozzle holes 332b close, while when the tip of the valve element 335 leaves the valve body 332, the nozzle holes 332b open.

A large-diameter portion 335c is formed at an intermediate position of the valve element 335 (a position corresponding to the distance piece 334) and a spring retainer 336 and a shim (shim member) 337 are disposed so as to be put on the large-diameter portion 335c. A spring 338 is provided between an inner wall of the casing 331 and the shim 337 and the valve element 335 is urged to the valve closing side (downward in the figure) constantly by the spring 338.

Figure 20:
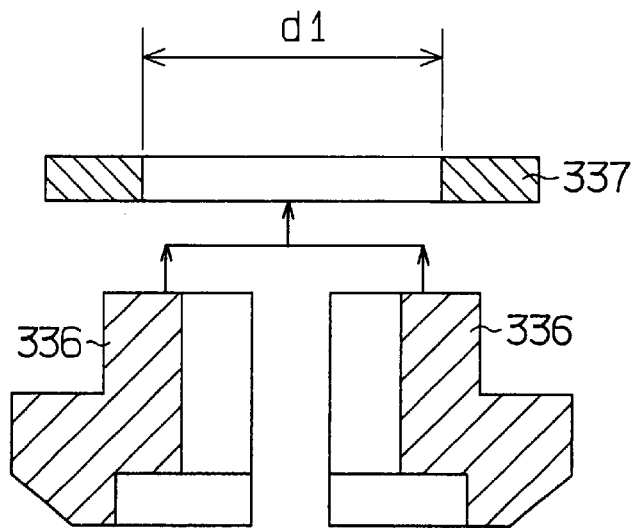
FIG. 20 is a sectional view showing a disassembled state of components of the injector according to the eighth embodiment of the present invention.
Figure 21:
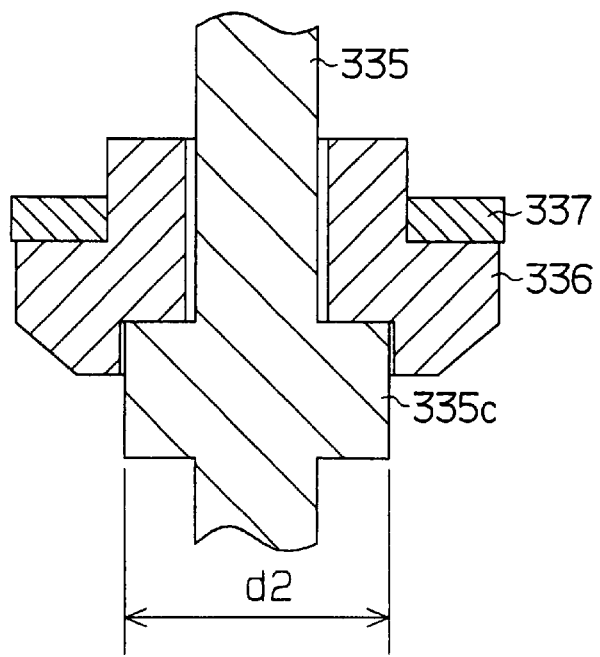
FIG. 21 is a partial sectional view of the injector according to the eighth embodiment of the present invention.

As shown in FIG. 20, the spring retainer 336 is constituted by bisectable halves (pieces) and the shim 337 is constituted by a ring plate. As shown in FIG. 21, the spring retainer 336 is mounted to the large-diameter portion 335c in a sandwiching relation to the valve element 335, followed by further mounting of the shim 337 to fix the spring retainer 336. The shim 337 fulfills a spring force adjusting function. That is, the biasing force of the spring 338 is adjusted by changing the plate thickness of the shim 337.

Referring back to FIG. 17, an inlet port member 348 is attached to the casing 331 in a sandwiching relation to a gasket 347 and fuel of a high pressure is introduced from a common rail into the holes 331a and 332a through the inlet port member 348. A bar filter for preventing the entry of foreign matters is press-fitted and fixed into the inlet port member 348.

On the other hand, according to the construction of an electromagnetic solenoid section, an armature 339 is fixed to an upper end in the figure of the valve element 335 and a stator 340 is provided in opposition to the armature 339.

A coil 341 is disposed on an outer periphery of the stator 340. A shim 342 is disposed between the stator 340 and the casing 331 and in this state a cap housing 343 is mounted to the casing 331.

An armature chamber 351 for receiving the armature 339 therein is in communication with the hole 331a through a communication passage 350 and a liquefied gas fuel of a high pressure is introduced into the armature chamber 351. Therefore, the high pressure fuel acts on the valve element 335 at any position and thus it is possible to eliminate the leakage of fuel such that the fuel leaks out from high to low pressure position in the slide portion of the valve element.

Figure 18:
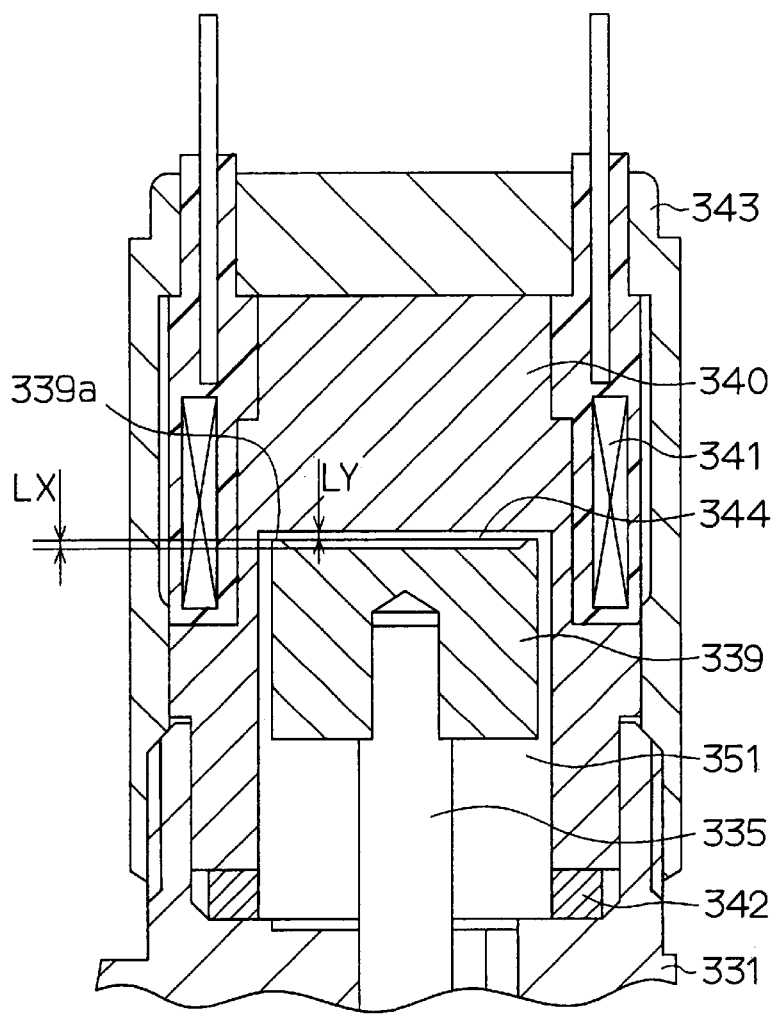
FIG. 18 is a partial sectional view of the injector according to the eighth embodiment of the present invention.
Figure 19:
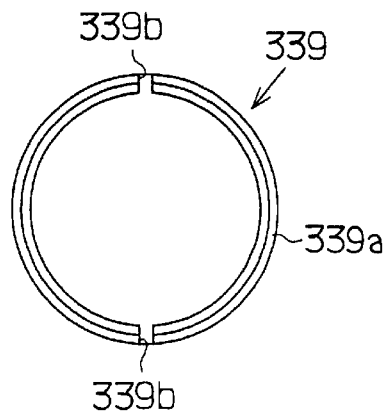
FIG. 19 is a plan view of components of the injector according to the eighth embodiment of the present invention.

The space between the armature 339 and the stator 340 serves as an oil pressure damper chamber 344, the construction of which will now be described with reference to FIG. 18. In the same figure, out of an end face of the stator 340 and that of the armature 339, the former is formed flat. On the other hand, on an outer edge portion of the end face of the armature 339 is formed annular protuberance 339a, which corresponds to a stepped portion, with a recess being defined so as to be surrounded by the protuberance 339a. The protuberance 339a also plays the role of a stopper when the armature moves. When the valve element 335 opens, an open position thereof is defined by the position at which the protuberance 339a of the armature 339 abuts the stator 340. FIG. 19 is a plan view of the armature 339 as seen from above. As shown in the same figure, cutout portions are formed in the protuberance 339a at one or more positions (two positions in the figure).

The larger the volume change rate of the oil pressure damper chamber 344 relative to the valve lift quantity (stroke), the more outstanding the effect as an oil pressure damper. In other words, in the construction of FIG. 18, the smaller the height LX of the protuberance 339a, the more outstanding the effect as an oil pressure damper. However, if the height LX of the protuberance 339a is too small, it is difficult to attain a high machining accuracy.

In this embodiment the height LX is set at 0.1–0.3 mm as an example. A lift quantity (distance LY in the figure) of the valve element 335 is adjusted by the shim 342 disposed between the stator 340 and the casing 331.

In the fuel injector 330 of the above construction, when the coil 341 is de-energized, the valve element 335 is held in its closed position with the biasing force of the spring 338. At this time, the nozzle holes 332b are closed to stop the injection of fuel by the fuel injector 330. When the coil 341 is energized, the armature 339 is attracted to the stator 340 and the valve element 335 moves to its open side (upper side in the figure) against the biasing force of the spring 338. The valve element 335 lifts until abutment of the protuberance 339a of the armature 339 against the stator 340, so that the nozzle holes 332b open to effect the injection of fuel.

With lift of the valve element 335, the spacing (distance LY) between the protuberance 339a of the armature 339 and the stator 340 becomes shorter and the volume of the oil pressure damper chamber 344 becomes smaller. The fuel present within the oil pressure damper chamber 344 flows out through the spacing (distance LY) between the protuberance 339a and the stator 340, which spacing, however, becomes narrower with lift of the valve element 335 and acts as an oil pressure damper. When the valve opening of the fuel injector 330 is completed, the oil pressure chamber 344 is shut off from the exterior by contact of the protuberance 339a with the stator 340.

When the fuel injector 330 closes, the valve element 335 returns to its closed position with the biasing force of the spring 338 upon de-energization of the coil 341. At this time, the liquefied gas fuel is introduced between the armature 339 and the stator 340 through the cutout portions 339b, whereby the disengagement between the armature 339 and the stator 340 is done quickly. Consequently, the closing motion of the valve element 335 is assisted and the valve element 335 closes quickly.

Figure 22:
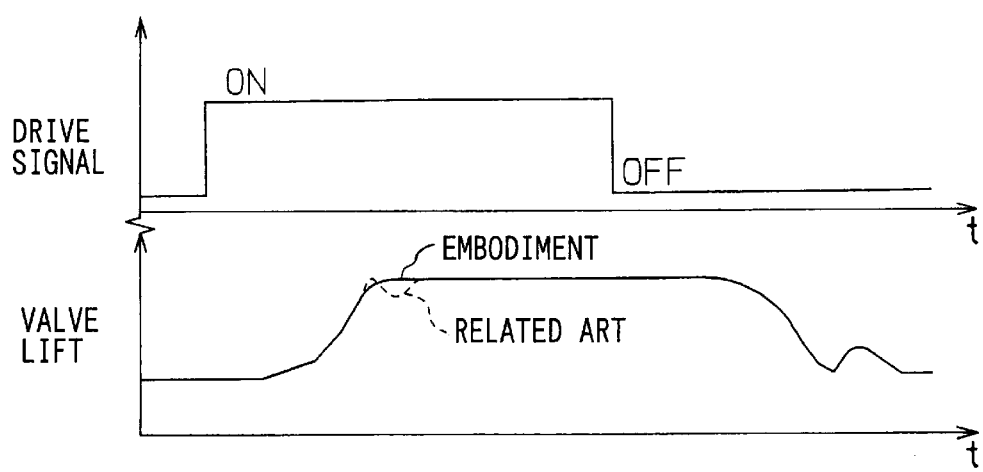
FIG. 22 is a time chart showing the operation of the injector according to the eighth embodiment of the present invention.
Figure 23:
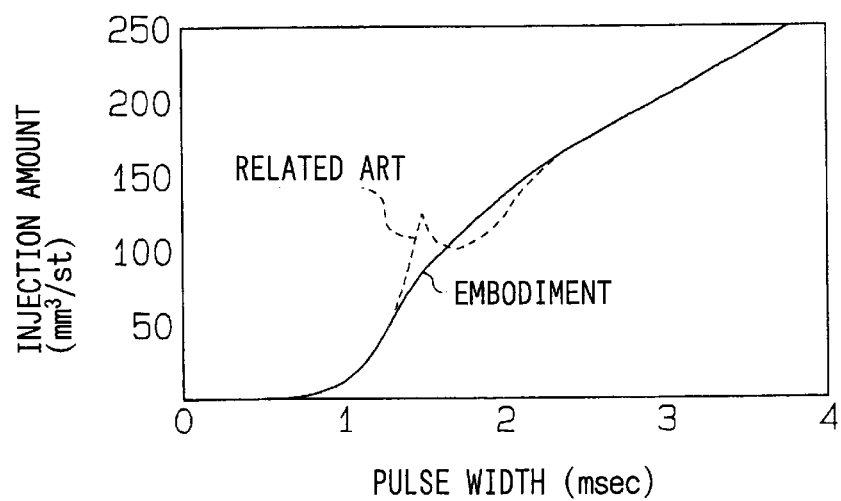
FIG. 23 is a graph showing an injection quantity characteristic of the injector according to the eighth embodiment of the present invention.

FIG. 22 is a time chart showing a lift behavior of the valve element relative to a drive signal for the fuel injector 30 and FIG. 23 illustrates an injection quantity characteristic of the fuel injector 330. In both figures, the related art is indicated with dotted lines for comparison purpose.

In FIG. 22, after turning ON of a drive signal which is inputted to the fuel injector 330 from ECU 4, the lift of the valve element 335 is started and the valve opening motion is ended upon abutment of the protuberance 339a of the armature 339 against the stator 340. Thereafter, the fuel injector 330 is held in its open condition. In this case, the bouncing of the valve element 335 upon arrival of the valve element 335 at its opening position (upon abutment of the protuberance 339a against the stator 340) is diminished. After opening of the valve element 335 and upon turning OFF of a drive signal, the fuel injector 330 closes.

In FIG. 23, the pulse width plotted along the axis of abscissa represents an elapsed time from the start of valve opening. In this embodiment, unlike the related art, there is obtained a characteristic such that the injection quantity increases monotonously with an increase of the pulse width. Thus, it is seen that a satisfactory injection characteristic (metering characteristic) can be achieved.

Next, a description will be given of a mounting procedure for the fuel injector 330, especially a mounting procedure for the spring 338, with reference to FIGS. 24 and 25. First, the electromagnetic solenoid section and the inlet port member 348 are mounted to the casing 331.

The valve element 335 integral with the armature is also mounted.

Figure 24:
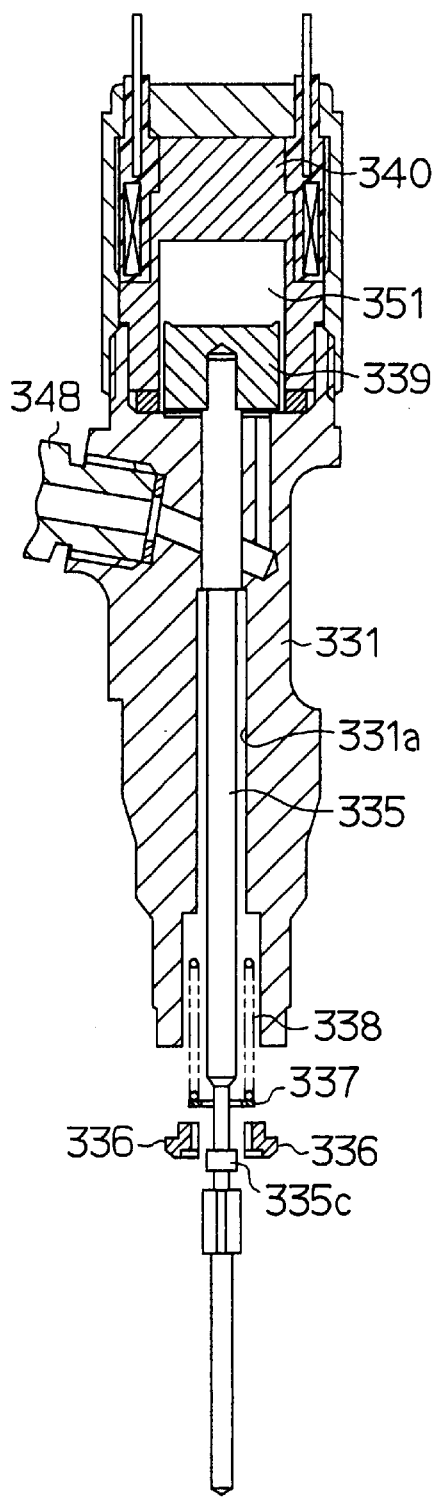
FIG. 24 is a sectional view showing a disassembled state of the injector according to the eighth embodiment of the present invention.
Figure 25:
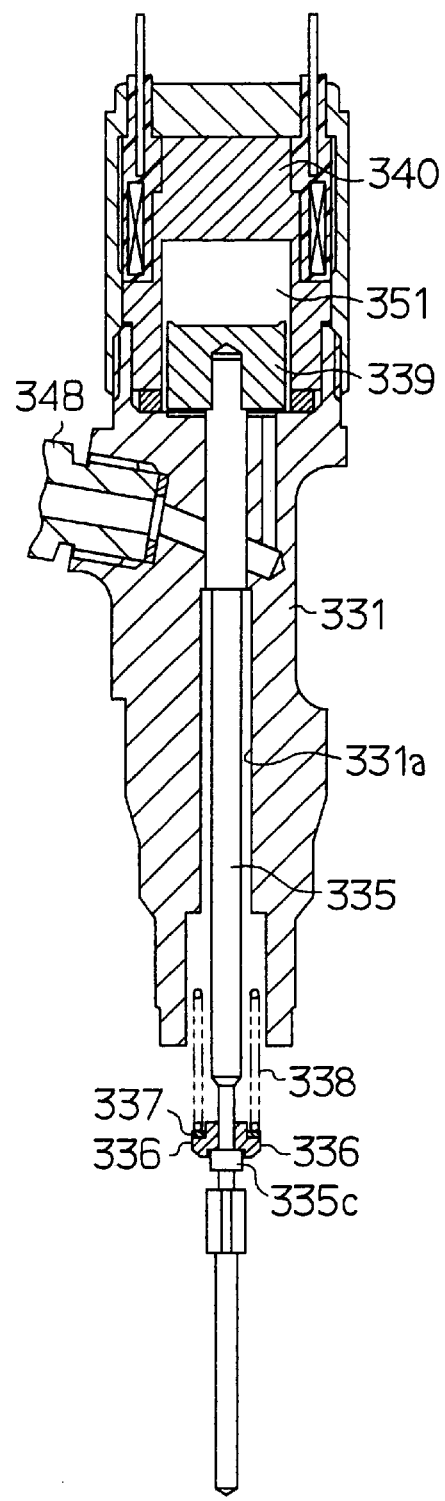
FIG. 25 is a sectional view showing a disassembled state of the injector according to the eighth embodiment of the present invention.

As shown in FIG. 24, an integral combination of the valve element 335 and the armature 339 is brought down insofar as possible and in this state the spring 338 and the shim 337 are fitted on the valve element 335, then two bisplit spring retainer halves 336 are mounted on the large-diameter portion 335c. Then, as shown in FIG. 25, with the two spring retainer halves 336 coupled together, the shim 337 is fitted to fix the spring retainer 336. Thereafter, the distance piece 334 and the valve body 332 are fixed with the retaining nut 333, whereby the mounting of the fuel injector 330 is completed.

In the above mounting work, the diameter d1 of the shim 337 is set larger than the outside diameter d2 of the large-diameter-portion 335c of the valve element 335. For example, d1 is 4.1 m and d2 is 4.0 mm. Therefore, the shim 337 can be inserted from the lower side of the valve element 335. Further, as shown in FIG. 17, the distance LZ (armature moving space) between a lower end face of the armature 339 and the casing 331 in the armature chamber 351 is ensured sufficiently, whereby the valve element 335 can be brought down as shown in the figure, thus permitting easy mounting of the spring 338, etc.

According to this embodiment described above in detail there are obtained the following effects.

Since the oil pressure damper chamber 344 is provided between the armature 339 and the stator 340, the bouncing of the valve element 335 and that of the armature 339 in valve opening are suppressed by virtue of a damper effect. Consequently, the fuel injection quantity can be kept under control.

Since the cutout portions 339b are formed in the protuberance 339a of the armature 339, disengagement between the armature 339 and the stator 340 is done quickly when the valve element 335 returns to its closed position after valve opening. Accordingly, the fuel injector 330 operates in a satisfactory manner.

Figure 28:
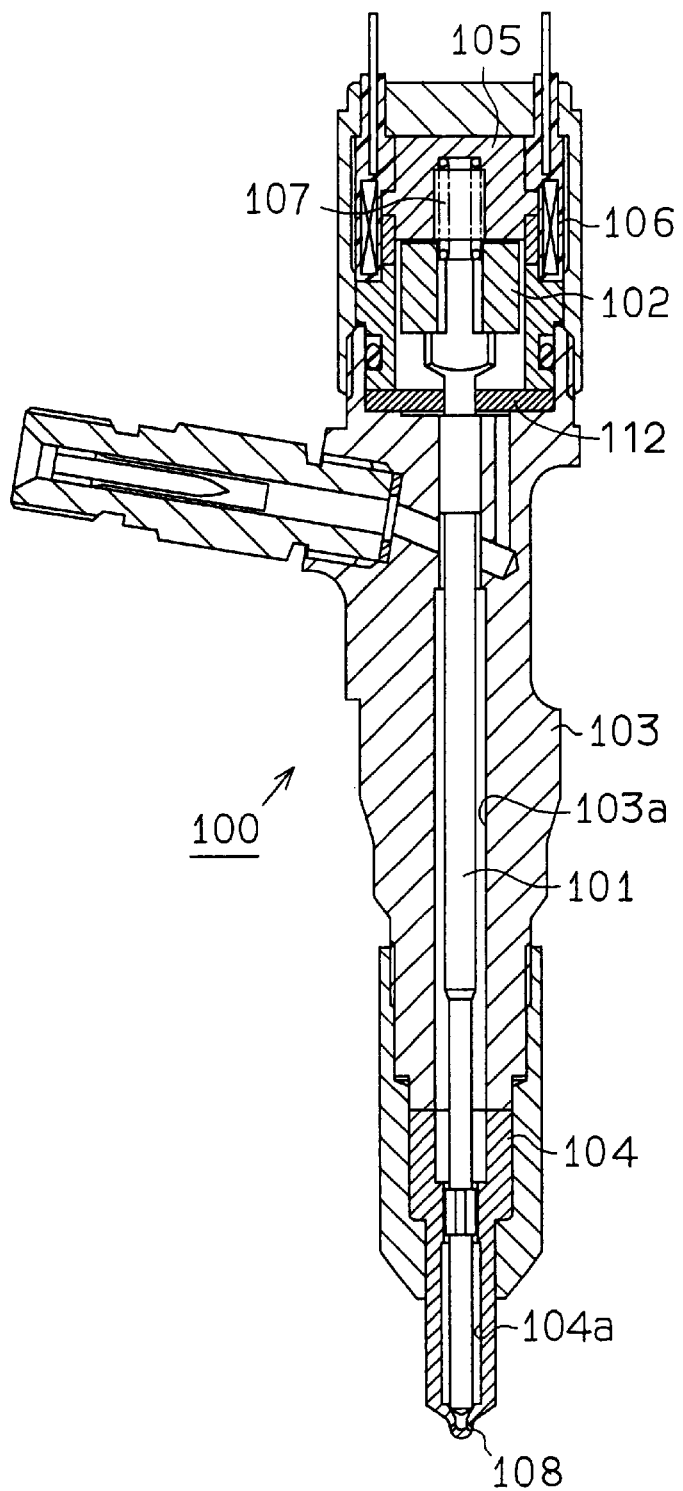
FIG. 28 is a sectional view of an injector according to a related art.

Since the spring 338 is disposed at an intermediate position of the valve element 335, it is not necessary for the spring to be interposed between the armature and the stator as in the construction of FIG. 28. Consequently, it is possible to realize an advantageous construction including the oil pressure damper chamber 344. As to the construction of the spring retainer portion, since the spring retainer 336 comprising plural split pieces is used, it is easy to effect mounting of the spring retainer 336. Further, the spring force can be adjusted by adjusting the thickness of the shim 337.

Since the fuel injector 330 described above adopts an actuator direct acting type construction, the leakage of fuel is diminished and the fuel injector thus embodied is suitable as a fuel injector for a liquefied gas fuel. Further, since a liquefied gas fuel is low in viscosity, the use thereof causes a serious problem of valve element bouncing, but this problem can be solved by the above construction of the fuel injector 330.

Figure 26:
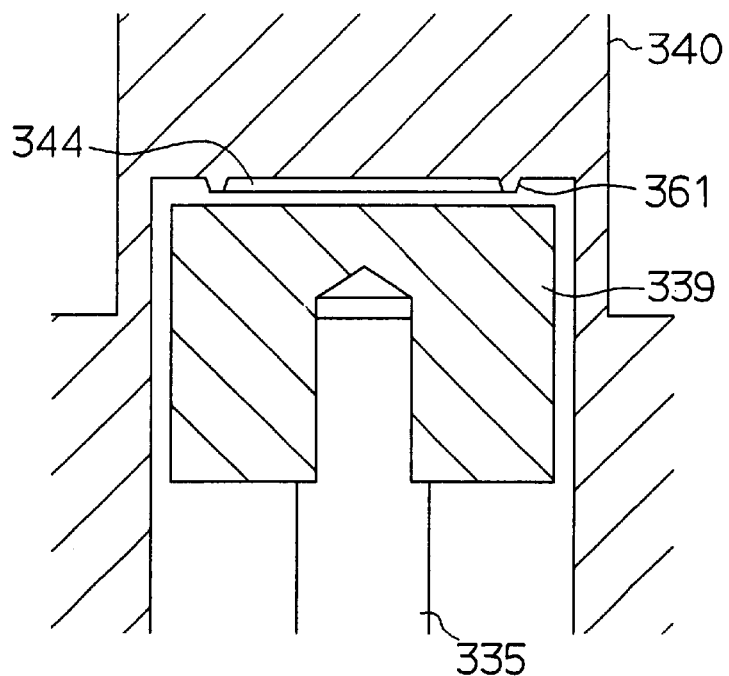
FIG. 26 is a sectional view showing a disassembled state of an injector according to a ninth embodiment of the present invention.

A ninth embodiment will now be described. In this ninth embodiment, as shown in FIG. 26, an end face of an armature 339 is formed flat and an annular protuberance 361 is formed on an end face of a stator 340. In this case, the protuberance 361 corresponds to a stepped portion and an oil pressure damper chamber 344 is formed by a recess which is surrounded with the protuberance 361.

Figure 27:
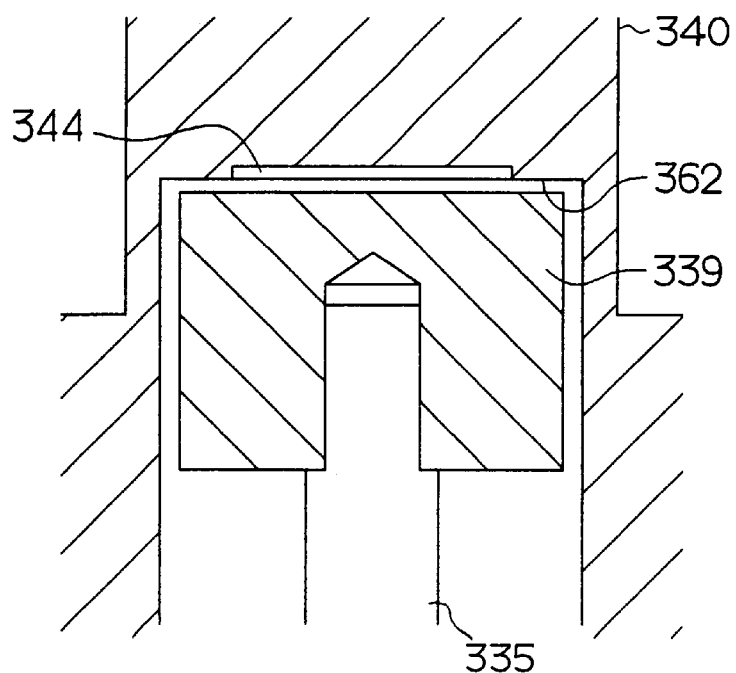
FIG. 27 is a sectional view showing a disassembled state of an injector according to a tenth embodiment of the present invention.

Next, a tenth embodiment will be described. In this tenth embodiment, as shown in FIG. 27, a stator 340 is provided with a stepped portion 362 instead of protuberance 361. In FIG. 27 the machining of the stator 340 for forming an oil pressure damper chamber 344 is easier than in FIG. 26. At a position near the protuberance 361 or near the stepped portion 362 the stator 340 may be divided in two vertically in the figure. In this case, the machining of the protuberance 361 or the stepped portion 362 becomes still easier. Stepped portions (or protuberances) may be formed at end faces of both armature and stator to define an oil pressure damper chamber.

When the valve element 335 opens in the construction of FIGS. 26 and 27, its open position is defined by the position at which an end face of the armature 339 abuts the protuberance 361 or the stepped portion 362. In this case, it is preferable that a cutout portion be formed in at least one position of the protuberance 361 or the stepped portion 362.

Although in the above embodiments the protuberance 339a of the armature 339 or the protuberance 361 or the stepped portion 362 of the stator 340 functions as a stopper, there may be provided a separate stopper member. That is, it is not always necessary to adopt the construction wherein the armature 339 side and the stator 340 side are in contact with each other. There may be adopted another construction insofar as there is obtained an oil pressure damping function during movement of the valve element 335.

Although in the above embodiments a sufficient distance LZ (armature moving space) between the lower end face of the armature 339 and the casing 331 is ensured so that the valve element 335 can be brought down in the armature chamber 351, this point is not essential to accomplishing the present invention. There may be adopted a construction wherein the distance LZ (armature moving space) is small. In this case, however, for improving the mountability of the spring 338 disposed at an intermediate position of the valve element 335, it is preferable to for example shallow the spring receiving portion of the casing 331 which portion is for receiving the spring 338 therein (extend the length of the distance piece 334 upward in FIG. 17).

Although in the above embodiments the present invention is embodied as fuel injectors for the injection of liquefied gas fuels such as DME and LPG, the invention may be embodied as a fuel injector for the injection of any other fuel, e.g., gas oil or gasoline. Also in this case it is possible to keep the fuel injection quantity under control.

Next, an eleventh embodiment will be described. In this embodiment, a nozzle side (valve closing direction) and an opposite-to-nozzle side (valve opening direction) are assumed to be a lower side and an upper side, respectively, but these are for the convenience of explanation and are different from those in actual mounting.

Figure 29:
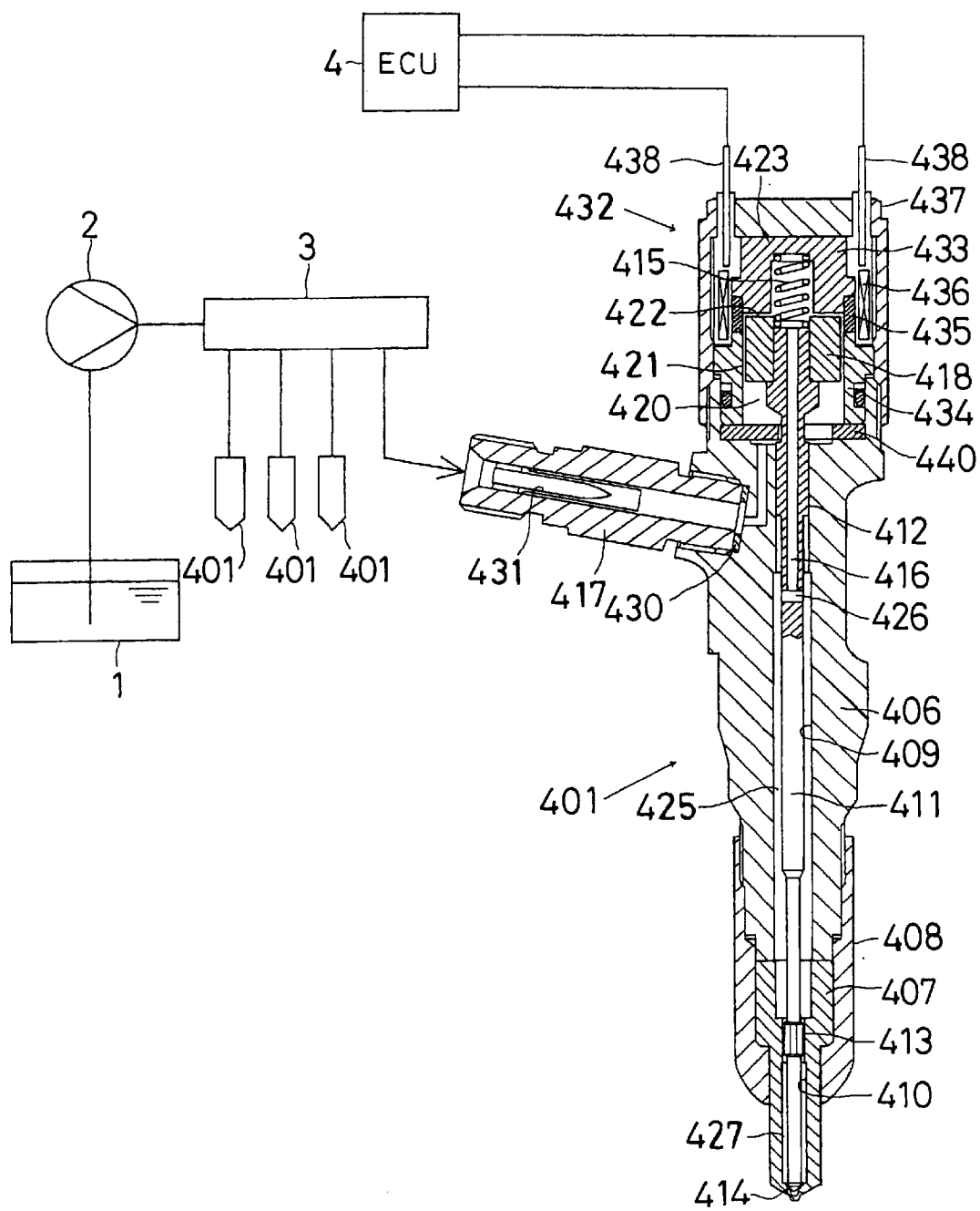
FIG. 29 is a sectional view of an injector according to an eleventh embodiment of the present invention.

FIG. 29 illustrates a sectional structure of a fuel injector 401 and a construction around the fuel injector.

The construction of the fuel injector 401 will be described below in detail.

A casing of the fuel injector 401 is constituted by a coupled combination of a body 406 and a nozzle body 407, which are rendered integral with each other by tightening a retaining nut 408. Coaxial through holes 409 and 410 are formed in the body 406 and the nozzle body 407, respectively, with an elongated valve element 411 being received into the through holes 409 and 410.

The valve element 411 is adapted to slide vertically through the through holes 409 and 410 and has slide portions 412 and 413 at two upper and lower positions respectively. Plural nozzle holes 414 are formed at a tip portion of the nozzle body 407. When a tip of the valve element 411 comes into abutment against (sits on) the nozzle body 407, the nozzle holes 414 close, while when the tip of the valve element 411 leaves (disengages from) the nozzle body 407, the nozzle holes 414 open.

A compression coil spring 415 is disposed at an upper end portion of the valve element 411. The valve element 411 is urged downward constantly with a restoring force of the spring 415.

A fuel hole 416 is formed on an upper side of the valve element 411 and fuel fed from an inlet 417 flows through a passage formed within the body 416, a first chamber 420 formed just under an armature 418, a throttle portion 421 defined by a clearance between the armature 418 and a surrounding component, further through a second chamber 422 formed just above the armature 418, and is introduced into the fuel hole 416 located centrally of the armature 418.

The throttle portion 421 is defined by a clearance between a side face of the armature 418 and a lower inner core 434 which constitutes a lower portion of a stator 423. The clearance is set at a value in the range from 60 to 300 μm in terms of a radial size.

In an intermediate position of the valve element 411 is formed a branch hole 426 for conducting fuel conducted from the fuel hole 416 into a fuel passage 425 which is formed between the through hole 409 of the body 406 and the valve element 411. The fuel thus introduced into the fuel passage 425 is then conducted to the nozzle holes 414 side through a nozzle chamber 427 formed between the through hole 410 of the nozzle body 407 and the valve element 411.

Next, the inlet 417 will be described below.

The inlet 417 is mounted to the body 406 in a sandwiching relation to a gasket 430 and serves as an inlet for a common rail 3. A bar filter 431 for preventing the entry of foreign matters is press-fitted and fixed into the inlet 417.

Next, reference will be made below to an electromagnetic solenoid valve 432.

An armature 418 in the electromagnetic solenoid 432 is fixed to the upper portion of the valve element 411 by press-fitting for example, and a stator 423 is disposed in opposition to the armature 418. Thus, there is constituted what is called a plunger type solenoid.

The stator 423 is made up of an upper inner core 433 having an attraction face, a lower inner core 434 located sideways of the armature 418 and having a pole face, and a ring-like middle inner core 435 sandwiched between the upper inner core 433 and the lower inner core 434.

The upper inner core 433 and the lower inner core 434 are formed of a soft magnetic material because they serve as magnetic paths of the electromagnetic solenoid 432. On the other hand, the middle inner core 435 is formed of a non-magnetic material to block the passage of a magnetic flux.

The upper inner core 433, the lower inner core 434, and the middle inner core 435 are stacked and in this stacked state they are integrally fixed by a bonding means such as laser welding to constitute the stator 423.

A coil 436 for generating a magnetic force to let the armature 418 be attracted to the stator 423 is disposed on an outer periphery of the stator 423 and is fixedly molded with resin together with connecting terminals 438 within a solenoid housing 437.

A stopper 440 is disposed between the stator 423 and the body 406. The stopper 440 not only functions to determine a fully open position of the valve element 411 but also functions as a shim for adjusting the spacing (i.e., a final gap) between the armature 418 and the stator 423.

The following description is now provided about the operation and effect of the fuel injector 401 in this embodiment.

Figure 30:
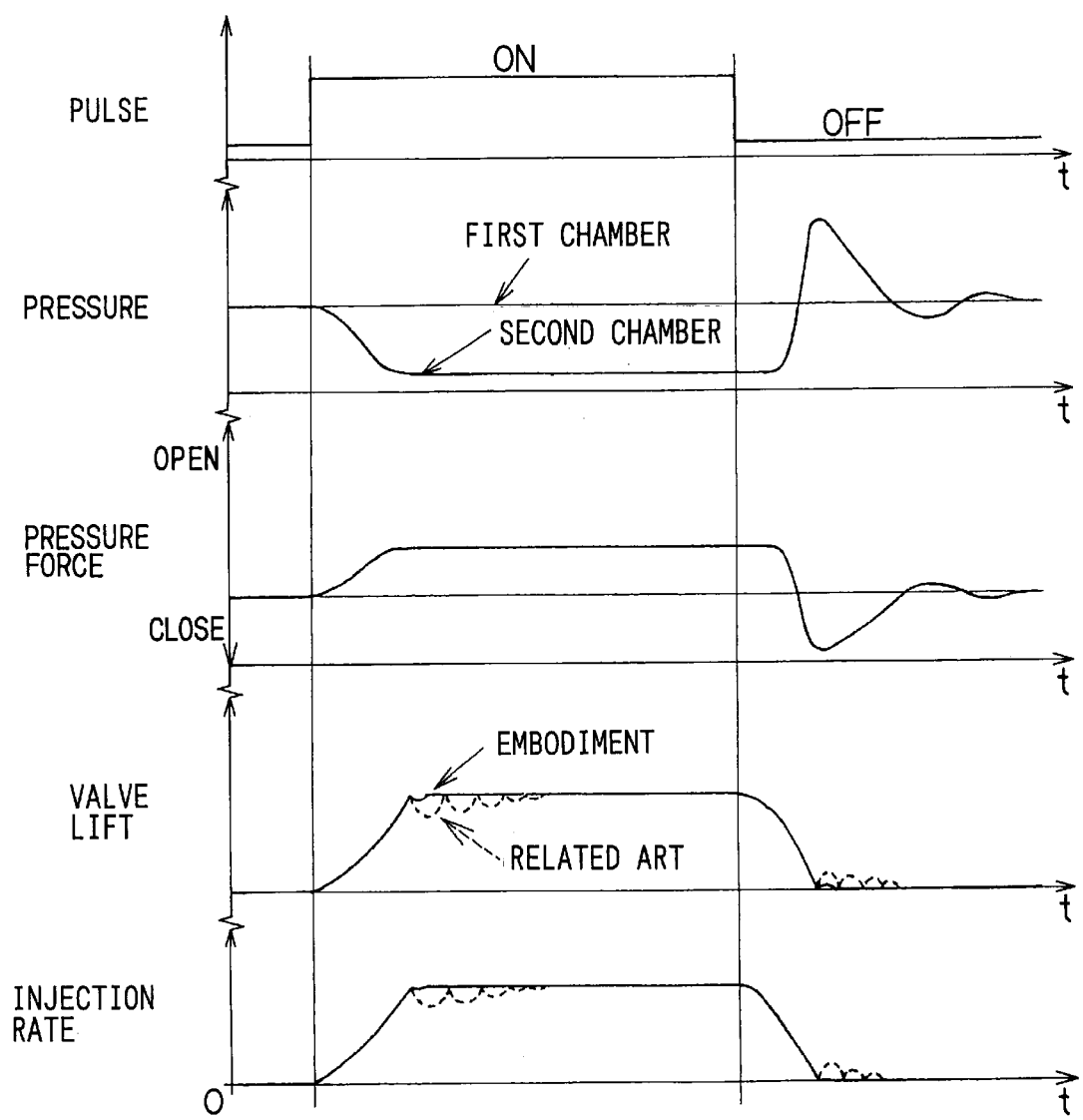
FIG. 30 is a time chart showing the operation of the injector according to the eleventh embodiment of the present invention.

FIG. 30 is a time chart showing pressure behaviors of the lower first chamber 420 and the upper second chamber 422. In the same figure, valve lift and injection rate in this embodiment are indicated with solid lines and those in the related art are indicated with broken lines.

Figure 31:
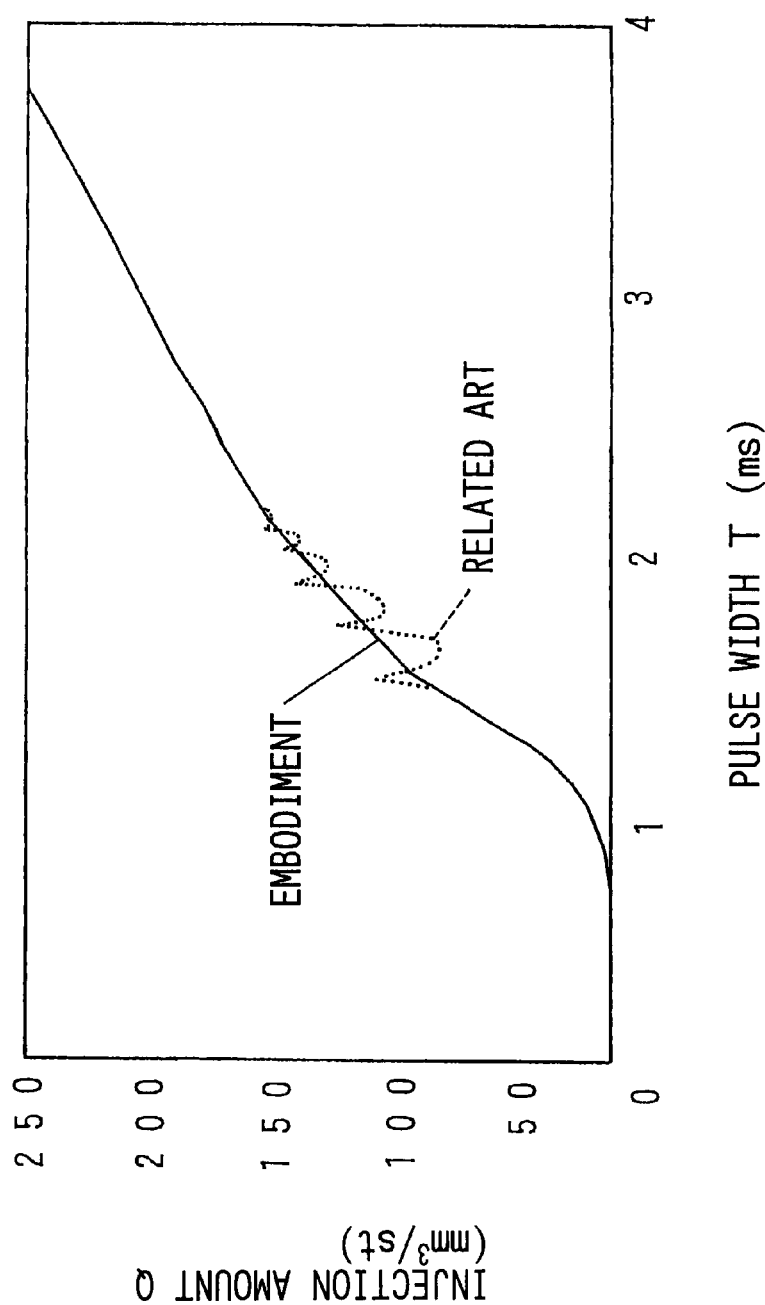
FIG. 31 is a graph showing an injection quantity characteristic of the injector according to the eleventh embodiment of the present invention.

FIG. 31 is a T-Q characteristic diagram showing an injection quantity (Q) relative to pulse width T.

Upon turning ON of a drive signal provided from ECU 4 to energize the coil 436, the armature 418 is attracted to the stator 423 and the valve element 418 lifts upward against the biasing force of the spring 415. When the valve element 411 abuts the stopper 440, the valve opening motion is over and subsequently the valve element is held in the open condition. As the valve element 411 rises, its tip leaves (disengages from) the nozzle body 407 and the nozzle holes 414 open, allowing liquid fuel to be injected through the nozzle holes.

Figure 33:
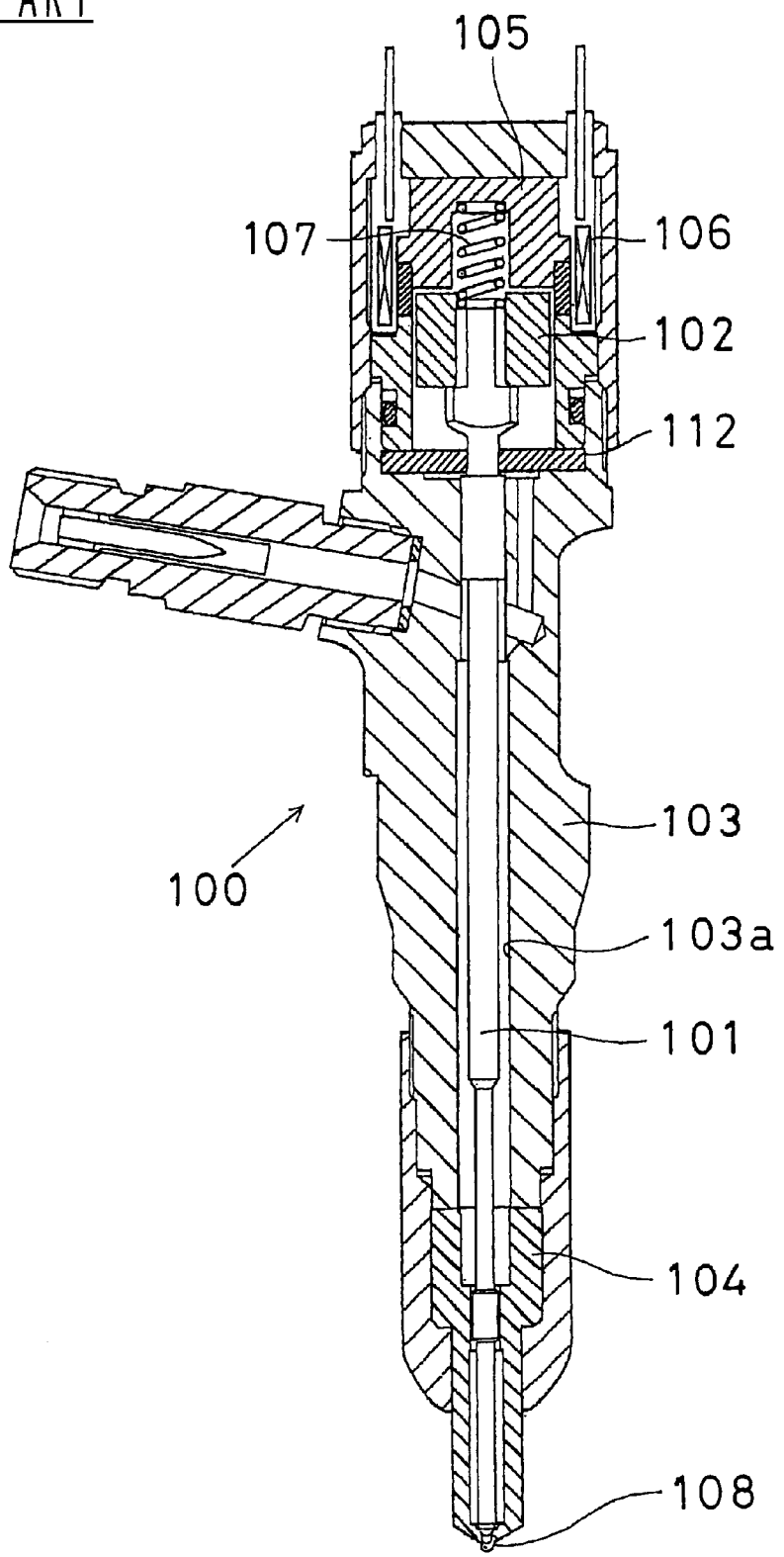
FIG. 33 is a sectional view of an injector according to a related art.

In the fuel injector 100 of the related art shown in FIG. 33, the valve element 101 and the stopper 111 strike against each other at the time of valve opening, resulting in that there occurs bouncing of the valve element 101 several times as indicated with broken lines in FIG. 30. The injection rate is influenced by the bouncing and deteriorates. Further, as indicated with a broken line in FIG. 31, the injection rate Q is wavy relative to the pulse width T and thus it is impossible to effect a stable injection control.

In the fuel injector 401 of this embodiment, as compared with the above related art, when the injection of fuel is started, the internal pressure of the nozzle chamber 427 and that of the second chamber 422 (an upper surface of the armature 418) which is in communication with the nozzle chamber 427 decrease. At this time, the internal pressure of the first chamber 420 (a lower surface of the armature 418) changes little because the propagation thereof is prevented by the throttle portion 421 formed sideways of the armature 418. Consequently, an oil pressure difference acts up and down of the armature 418 and the armature (corresponding to the pressure receiving portion) is urged upward (in the valve opening direction) due to the oil pressure difference. With the urging force induced by the pressure difference, the bounce of the valve element 411 in valve opening is suppressed.

At the time of fuel injection, the fuel flows out of the first chamber 420 (below the armature 418), then flows through the passage (throttle portion 421) formed sideways of the armature 418, and further flows toward the overlying second chamber 422 (above the armature 418). With this upward flow of the fuel, the armature 418 is given an upward force (in the valve opening direction). Also by this action the bounce of the valve element 411 is prevented.

Upon turning OFF of the drive signal provided from ECU 4 to de-energize the coil 436, there no longer is any attractive force for the armature 418 by the stator 423 and the valve element 411 is displaced downward with the biasing force of the spring 415. When the valve element 411 abuts the sheet of the valve body 407, the valve closing operation is over and thereafter the closed state of the valve is maintained. When the valve element 411 moves down and the tip thereof comes into abutment against (sits on) the nozzle body 407, the nozzle holes 414 close to stop the injection of fuel.

In the conventional fuel injector 100 shown in FIG. 33, due to collision of the valve element 101 with the nozzle body 104 at the time of valve opening there occurs bouncing of the valve element 101 several times as indicated with a broken line in FIG. 30. As a result, there occurs a secondary injection after closing of the valve.

In the fuel injector 401 of this embodiment, as compared with the above related art, when the injection of fuel is stopped, the flow of injected fuel is cut off suddenly, so that the internal pressure of the nozzle chamber 427 and that of the second chamber 422 (the upper surface of the armature 418) which is in communication with the nozzle chamber 427 increase. At this time, the internal pressure of the first chamber 420 (the lower surface of the armature 418) changes little because the propagation thereof is prevented by the throttle portion 412 formed sideways of the armature 418. Consequently, an oil pressure difference acts up and down of the armature 418 and the armature is urged downward (in the valve closing direction) due to the oil pressure difference. With the urging force induced by the pressure difference, the bounce of the valve element 411 in valve closing is suppressed.

When the nozzle holes 414 are cut off and the internal pressure of the second chamber 422 rises, fuel flows out of the second chamber 422 (above the armature 418), then flow through the passage (throttle portion 421) formed sideways of the armature 418, and further flows toward the first chamber 420 (below the armature 418). With this downward flow of the fuel, the armature 418 is given a downward force (in the valve closing direction). Thus, also by this action the bounce of the valve element 411 in valve closing is suppressed.

On the other hand, since the fuel injector 401 described above adopts a direct acting type construction wherein the valve element 411 is actuated directly with the electromagnetic solenoid 432, there is little leakage of fuel and thus the fuel injector 401 is suitable as a fuel injector for a liquefied gas fuel.

Besides, even when the valve element 411 is long and heavy as in this embodiment, it is possible to improve the injection characteristic because the occurrence of bouncing of the valve element 411 is suppressed.

Further, in the case where the viscosity of fuel is low like such a liquefied gas fuel as LPG or DME, there arises a serious problem caused by bouncing of the valve element 411, but according to this embodiment it is possible to suppress the bounce of the valve element even in case of a low fuel viscosity.

Figure 32:
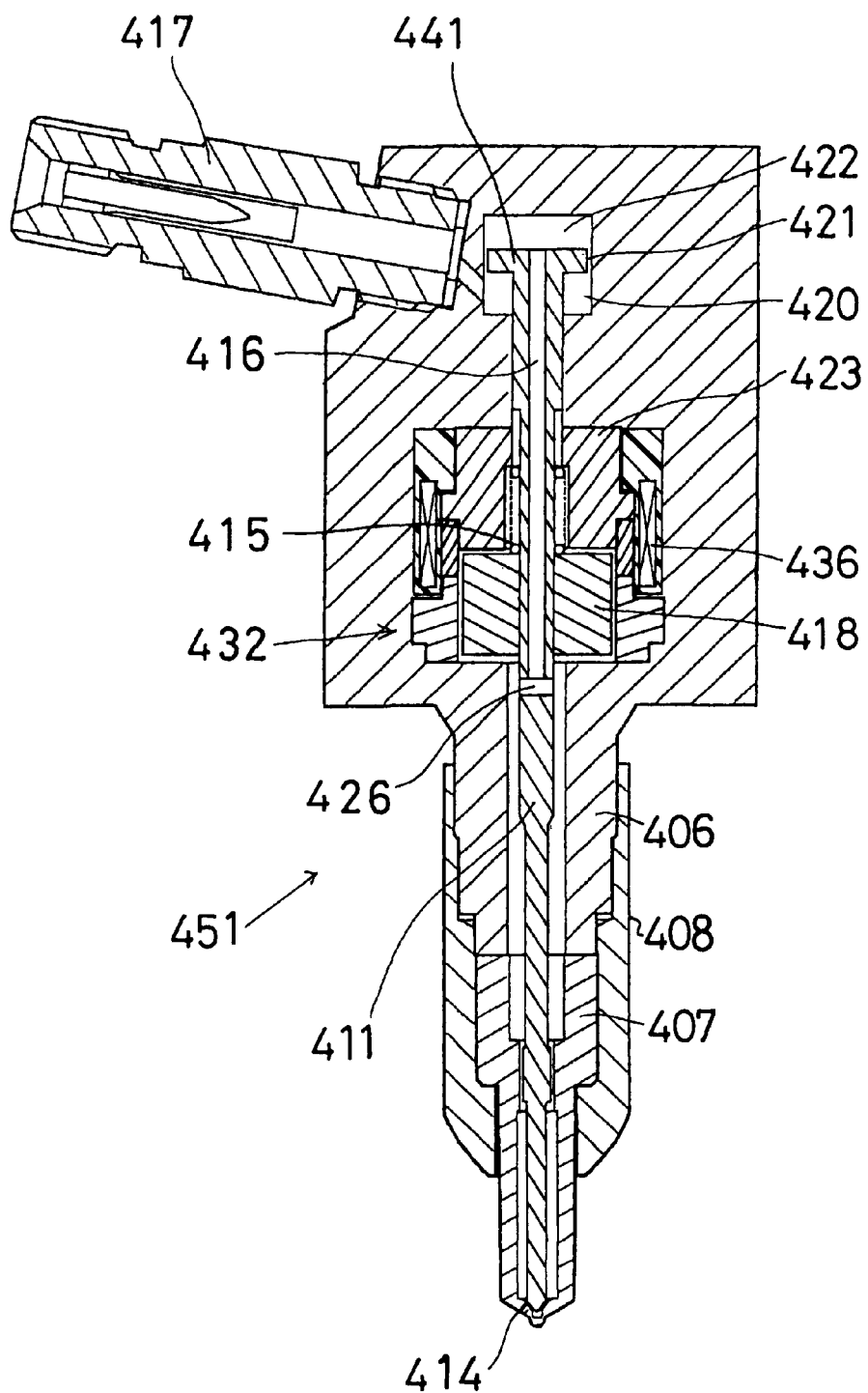
FIG. 32 is a sectional view of an injector according to a twelfth embodiment of the present invention.

A fuel injector 451 according to a twelfth embodiment of the present invention will now be described with reference to FIG. 32 which illustrates a sectional structure of the fuel injector 451. A description will be given below about a principal portion different from the previous eleventh embodiment. In this twelfth embodiment the same reference numerals as in the eleventh embodiment represent the same functional components as in the eleventh embodiment.

In this twelfth embodiment, disc 441 (corresponding to the pressure receiving portion) which undergoes a differential pressure is provided at an upper end of a valve element 411 which extends upward beyond the armature 418, and a first chamber 420 is formed below the disc 441, while a second chamber 422 is formed above the disc 441. Further, a throttle portion 421 is defined by a clearance between the disc 441 and a component (body 406).

Also with this arrangement it is possible to obtain the same effects as in the eleventh embodiment. The disc 441 which undergoes a differential pressure need not be positioned above the armature 418, nor need be the disc 441 in the shape of a disc.

Although the fuel injectors 401 and 451 of the above eleventh and twelfth embodiments are for the injection of a liquefied fuel such as DME or LPG, the present invention is also applicable to fuel injectors which inject other fuels. For example, the present invention may be applied to a fuel injector for the injection of gas oil or gasoline while preventing the occurrence of bouncing of a valve element used therein.

Although in the above embodiments there is used the electromagnetic solenoid 432 as an example of an electric actuator, there may be used another electric actuator such as a piezoelectric actuator comprising a large number of stacked piezoelectric elements.

Further, a passage resistance means for increasing the passage resistance of fuel may be provided in the throttle portion 421 so that the force of fuel flowing through the throttle portion 421 is greatly exerted on the valve element 411.

A thirteenth embodiment of the present invention will now be described. In this embodiment there are provided a fuel supply system for the injection and supply of a liquefied gas fuel such as DME or LPG to a diesel engine and also provided an air conditioner.

Figure 34:
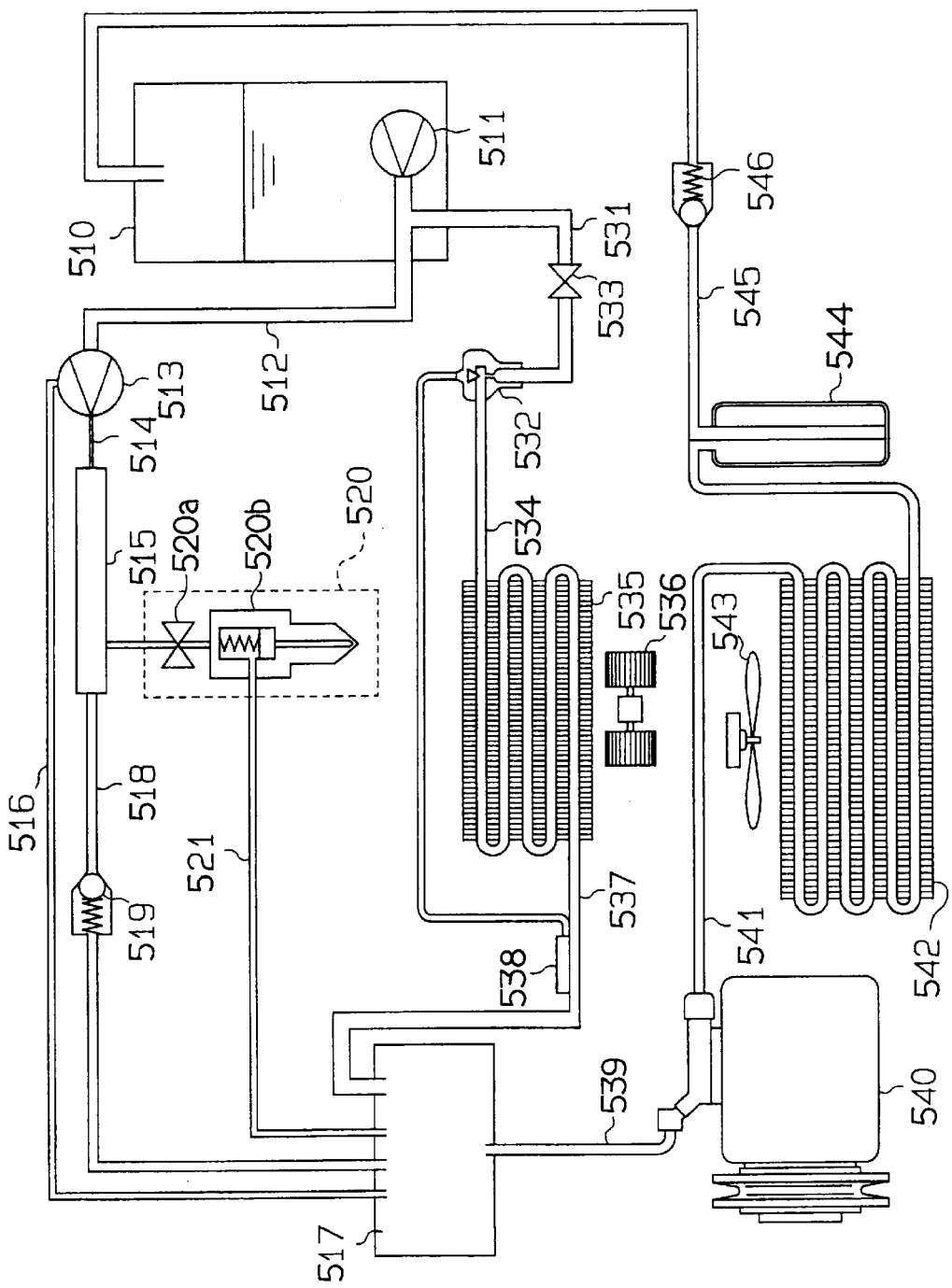
FIG. 34 is a block diagram showing a fuel injection system and an air conditioner both according to a thirteenth embodiment of the present invention.
Figure 35:
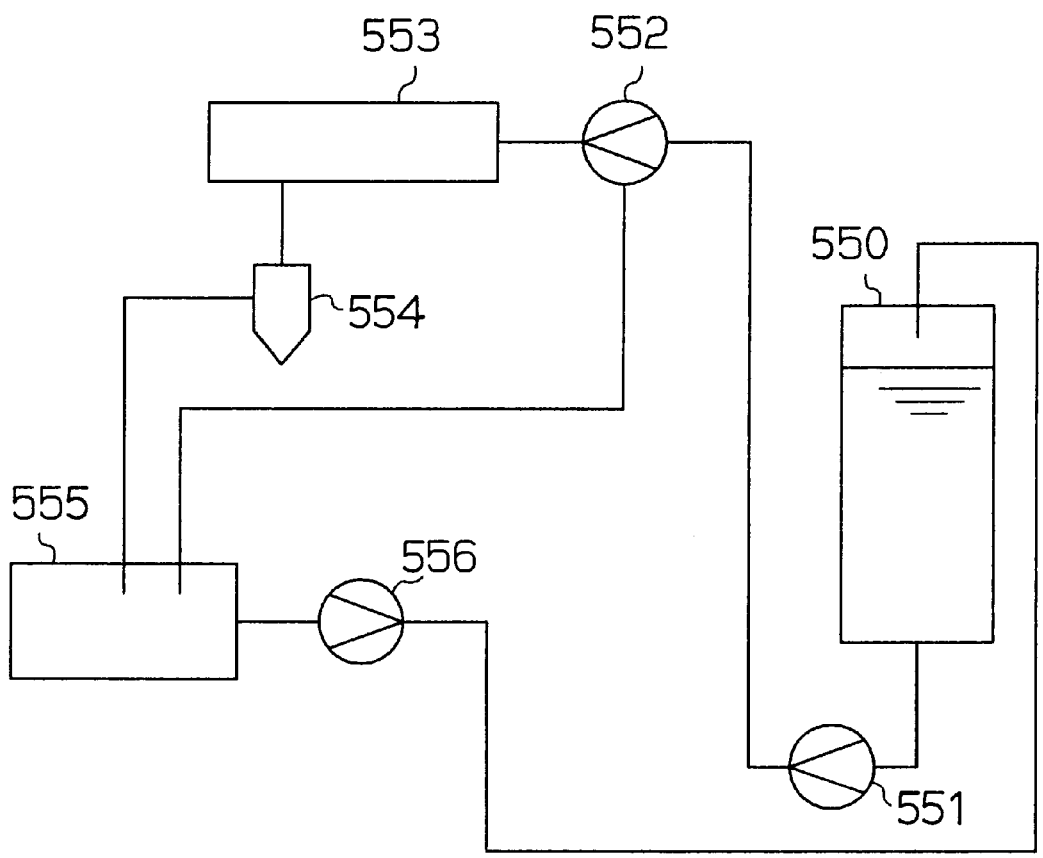
FIG. 35 is a block diagram of a system according to a related art.

In FIG. 34, a liquefied gas fuel such as DME or LPG is stored in a liquid state within a fuel tank 510. The internal pressure of the fuel tank 510 is equal to a saturated vapor pressure of the liquefied gas fuel. In case of using DME as a liquefied gas fuel, a saturated vapor pressure of DME is about 0.6 MPa at room temperature, for example, 25° C. A low pressure pump 511 is disposed within the fuel tank 510. With the low pressure pump 511, the liquefied gas fuel is fed in a pressurized state to a predetermined feed pressure (3 MPa or so) to a high pressure pump 513 through a pipe 512.

The internal pressure of the fuel tank 510 is equal to a saturated vapor pressure of the liquefied gas fuel, and when the temperature of the liquefied gas fuel locally rises only slightly or the pressure thereof locally drops only slightly within the fuel tank 510, there occur bubbles (vapor). In such a case, by disposing the low pressure pump 511 within the fuel tank 510, the formation of bubbles caused by a pressure drop in a path extending from the fuel tank 510 to the low pressure pump 511 and a deficient suction of the low pressure pump 511 are prevented. At the same time, a temperature difference between the fuel tank 510 and the low pressure pump 511 becomes smaller, whereby the formation of bubbles caused by the temperature difference and the resulting deficient suction of the low pressure pump 511 are prevented.

The high pressure pump 513 compresses the liquefied gas fuel to a high pressure (35 MPa or so) corresponding to the injection pressure and feeds the thus-compressed high pressure fuel to a common rail 515 through a pipe 514. The liquefied gas fuel leaking from a slide portion or a seal portion of the high pressure pump 513 passes through a pipe 516 and is recovered into a fuel recovery tank 517. The common rail 515 and the fuel recovery tank 517 are connected together through a pipe 518, with a pressure limiting valve 519 being disposed at an intermediate position of the pipe 518. In this case, surplus fuel is recovered into the fuel recovery tank 517 through the pressure limiting valve 519 lest the fuel pressure within the common rail 515 should exceed a predetermined level (35 MPa or so).

Fuel injectors 520 in a number corresponding to the number of engine cylinders are connected to the common rail 514, and as the fuel injectors 520 are actuated, the high pressure fuel stored in the common rail 515 is fed by injection to the diesel engine. The fuel injectors 520 are each constructed of an electromagnetic control valve 520a which intermits the supply of the high pressure fuel from the common rail 515 and an injection nozzle 520b which causes a valve element to move with operation of the electromagnetic control valve 520a and allows the fuel to be injected from a nozzle tip. The operation of each fuel injector is controlled by means of a microcomputer (not shown). The liquefied gas fuel leaking for example from a valve element slide portion of each fuel injector 520 passes through a pipe 521 and is recovered into the fuel recovery tank 517.

The following description is now provided about the air conditioner. The fuel which has been pressurized to about 3 MPa into a liquefied state by means of the low pressure pump 511 passes through a pipe 531 and is fed to an expansion valve 532. An air conditioner control valve 533 is installed at an intermediate position of the pipe 531, whereby the air conditioner is controlled ON and OFF. For example, when an air conditioner switch is turned ON by a vehicle occupant, the air conditioner control valve 533 is opened to permit the passage of the liquefied gas fuel flowing from the fuel tank 510 toward the expansion valve 532. Upon turning OFF of the air conditioner switch, the air conditioner control valve 533 is closed to inhibit the passage of the liquefied gas fuel flowing from the fuel tank 510 toward the expansion valve 532.

In the expansion valve 532, the liquefied gas fuel which is in a liquefied state is expanded rapidly into mist of a low temperature and low pressure and the misty fuel flows to an evaporator 535 through a pipe 534. In the evaporator 535, a latent heat necessary for evaporation is removed from the ambient air through evaporator fins, whereby the ambient air is cooled. At this time, a blower motor 536 is operated and the air present within the vehicle compartment is cooled thereby. The liquefied gas fuel evaporated in the evaporator 535 passes through a pipe 537 and is fed to the fuel recovery tank 517.

A pressure bulb 538 is attached to the pipe 537 and the degree of opening of the expansion valve 532 is adjusted in accordance with the fuel temperature detected by the pressure bulb 538. More specifically, the degree of opening of the expansion valve 532 becomes large when the fuel temperature is high, while it becomes small when the fuel temperature is low.

The liquefied gas fuel which has been recovered in a gaseous state into the fuel recovery tank 517 flows through a pipe 539 into a compressor 540, in which it is sucked and compressed. The liquefied gas fuel having been increased in both temperature and pressure in the compressor 540 passes through a pipe 541 and flows into a condenser 542. Then, in the condenser 542, the liquefied gas fuel is cooled with an engine cleaning fan and is liquefied while being removed its condensation latent heat. The fuel thus liquefied flows into a receiver tank 544, in which it is separated into gas and liquid. Then, only the liquid passes through a pipe 545 and is fed into the fuel tank 510.

At an intermediate position of the pipe 545 is provided a check valve 546, which permits only the flow of fuel advancing from the receiver tank 544 (condenser 542 side) toward the fuel tank 510. Therefore, for example when the engine is OFF, a reverse flow of the liquefied gas fuel from the interior of the fuel tank 510 to the receiver tank 544 is prevented.

According to the above construction shown in FIG. 34, in the common rail type fuel injection system, the liquefied gas fuel leaking from the high pressure pump 513, common rail 515 and fuel injectors 520 is once recovered into the fuel recovery tank 517 and is thereafter liquefied by means of the compressor 540 and the condenser 542, then is returned to the fuel tank 510. In this case, the compressor 540 and the condenser 542 not only plays its inherent role of liquefying the refrigerant (liquefied gas fuel) but also fulfills the role of recovering the leakage fuel. Thus, the sharing of the compressor 540 and the condenser 542 can be achieved.

Since in this embodiment the fuel injection system and the air conditioner share the compressor 540, the operation of the compressor 540 is kept ON during operation of the engine, but the operation of the air conditioner is turned ON or OFF arbitrarily by the air conditioner control valve 533. At this time, also in the case where the air conditioner control valve 533 is closed to turn OFF the air conditioner, the foregoing leakage fuel is separately liquefied by the compressor 540 and the condenser 542.

According to this embodiment described above in detail there are obtained the following effects.

Unlike the related art, since the compressor 540 and the condenser 542 are shared by the common rail type fuel injection system and the air conditioner, it is not necessary to use a fuel compressor dedicated to the recovery of fuel. As a result, it is possible to simplify the construction as a fuel supply system and reduce the cost. Of course, also as to the vehicle which carries this system thereon, the cost thereof can be reduced.

Since there is adopted a construction wherein a liquefied gas fuel is stored in a liquid state within the fuel tank 510 and is fed in the liquid state to the expansion valve 532 in the air conditioner, it is possible to feed the liquefied gas fuel in the liquid state to the expansion valve 532 from just after the start of the engine. That is, although the refrigerant (liquefied gas fuel) usually vaporizes while the engine is OFF, it is no longer required to wait for liquefaction of the refrigerant just after the start of the engine. Consequently, a vehicle compartment cooling effect can be obtained so much earlier.

Further, since the low pressure pump 511 is disposed within the fuel tank 510, a pressure drop in the path from the fuel tank 510 to the low pressure pump 511, the formation of bubbles due to a temperature difference between the fuel tank 510 and the low pressure pump 511, and a consequent deficiency in suction of the low pressure pump 511, can be prevented.

The position for the discharge of leakage fuel from the fuel injection system to the air conditioner side is not limited to the position between the evaporator 535 and the compressor 540. It may be changed as desired if it is possible to carry out the liquefying process for the leakage fuel and if the construction adopted permits the leakage fuel to be discharged upstream of the condenser 542.

Although in this embodiment the compressor 540 is essential to the air conditioner, it is also possible to accomplish the air conditioner without using the compressor 540. Particularly, in case of using a liquefied gas fuel as refrigerant, the liquefaction of the liquefied gas fuel can be done by only cooling and condensation in the condenser 542 and thus an air conditioner is constituted.

It is also possible to embody this system without using the fuel recovery tank 517. In this case, the fuel leaking from the fuel injection system may be discharged directly into a pipe (e.g., the pipe 539) laid within the air conditioner.

Although the fuel injection system in this embodiment is a common rail type fuel injection system, there may be used another type of a fuel injection system. For example, there may be adopted a construction wherein the liquefied gas fuel is pressurized high and is then fed to each fuel injector, using a distribution type fuel injection pump, without using a common rail.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A fuel injector comprising:
    an elongated valve element;
    a spring for urging the valve element in a valve closing direction; and
    an electromagnetic actuator having an armature integral with an end portion of the valve element and adapted to be attracted to a stator against the biasing force of the spring when a coil is energized, wherein:
        an oil pressure damper chamber is formed between an end face of the armature and an end face of the stator;
        one of the end face of the armature and the end face of the stator is generally flat;
        the other one of the end face of the armature and the end face of the stator includes an annular protuberance, which axially protrudes from the rest of the other one of the end face of the armature and the end face of the stator and radially inwardly defines the oil pressure damper chamber; and
        at least one cutout portion is formed in the annular protuberance to extend through a wall of the annular protuberance in a direction generally perpendicular to an axial direction of the valve element.

2. The fuel injector according to claim 1, further comprising a casing member which receives the valve element therein, wherein the valve element forms a large-diameter portion as a spring retaining portion at an intermediate position thereof, and the spring is disposed between the spring retaining portion and one end face of the casing member.

3. The fuel injector according to claim 2, further comprising a member which defines an armature chamber which receives the armature therein, wherein the oil pressure damper chamber is formed on one side of the armature and an armature moving space for allowing the armature to move away from the stator and drawing out the valve element is formed on the other side of the armature.

4. The fuel injector according to claim 1, wherein the fuel injector is supplied with a liquefied gas fuel and injects the supplied liquefied gas fuel from a nozzle hole in response to an opening operation of the valve element.

5. The fuel injector according to claim 1, wherein the other one of the end face of the armature and the end face of the stator is generally flat except the annular protuberance.

6. The fuel injector according to claim 1, wherein the annular protuberance extends along an outer peripheral edge of the other one of the end face of the armature and the end face of the stator.

7. The fuel injector according to claim 1, wherein the annular protuberance radially communicate between the oil pressure damper chamber and a space located radially outward of the annular protuberance when the one of the end face of the armature and the end face of the stator is engaged with the annular protuberance of the other one of the end face of the armature and the end face of the stator.

8. A fuel injector comprising:
    an elongated valve element;
    a spring for urging the valve element in a valve closing direction;
    an electromagnetic actuator having an armature integral with an end portion of the valve element and adapted to be attracted to a stator against the biasing force of the spring when a coil is energized, wherein an oil pressure damper chamber is formed between an end face of the armature and an end face of the stator;
    a casing member which receives the valve element therein, wherein the valve element forms a large-diameter portion as a spring retaining portion at an intermediate position thereof, and the spring is disposed between the spring retaining portion and one end face of the casing member;
    a spring retaining member constituted by a plurality of split pieces mounted on the large-diameter portion of the valve element; and
    a shim member mounted on the large-diameter portion of the valve element, the shim member being placed on a spring retaining face side of the spring retaining member and adapted to unite and fix the plural pieces of the spring retaining member.

9. The fuel injector according to claim 8, wherein the oil pressure damper chamber is defined by a recess, the recess enclosed by a stepped portion being formed in at least one of the end face of the armature and the end face of the stator which are opposed to each other.

10. The fuel injector according to claim 9, wherein the stepped portion provides a cutout portion, the armature comes into abutment against the stator through contact of the stepped portion, when the armature is attracted to the stator.

* * * * *